(12) United States Patent
Duisenberg et al.

(10) Patent No.: US 8,924,597 B2
(45) Date of Patent: Dec. 30, 2014

(54) DOMAIN MANAGEMENT PROCESSOR

(75) Inventors: Kenneth C. Duisenberg, Roseville, CA (US); Loren M. Koehler, Fair Oaks, CA (US); Tamra I. Perez, Antelope, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 5 days.

(21) Appl. No.: 12/997,138

(22) PCT Filed: Jun. 20, 2008

(86) PCT No.: PCT/US2008/067644
§ 371 (c)(1),
(2), (4) Date: Dec. 9, 2010

(87) PCT Pub. No.: WO2009/154629
PCT Pub. Date: Dec. 23, 2009

(65) Prior Publication Data
US 2011/0113160 A1     May 12, 2011

(51) Int. Cl.
| | | |
|---|---|---|
| G06F 3/00 | (2006.01) | |
| G06F 13/00 | (2006.01) | |
| G06F 13/36 | (2006.01) | |
| G06F 3/06 | (2006.01) | |

(52) U.S. Cl.
CPC ............ *G06F 3/0632* (2013.01); *G06F 3/0607* (2013.01); *G06F 3/067* (2013.01)
USPC ............... 710/8; 710/100; 710/107; 710/115; 710/301

(58) Field of Classification Search
USPC .............................. 710/8, 100, 107, 115, 301
See application file for complete search history.

(56) References Cited

U.S. PATENT DOCUMENTS

| | | | |
|---|---|---|---|
| 6,728,807 B1 * | 4/2004 | Laursen ........................ | 710/100 |
| 7,193,844 B2 * | 3/2007 | Garnett et al. ........... | 361/679.33 |
| 7,623,356 B2 * | 11/2009 | Leigh et al. .................... | 361/788 |
| 7,917,660 B2 * | 3/2011 | Van Patten Benhase et al. . | 710/8 |
| 7,987,353 B2 * | 7/2011 | Holdaway et al. ................ | 713/2 |
| 8,019,996 B2 * | 9/2011 | Hashimoto et al. ........... | 713/169 |
| 8,417,292 B2 * | 4/2013 | Kim et al. ..................... | 455/557 |
| 2002/0108059 A1 * | 8/2002 | Canion et al. ................. | 713/201 |
| 2003/0046339 A1 | 3/2003 | Ip | |
| 2003/0101304 A1 * | 5/2003 | King et al. ..................... | 710/301 |
| 2003/0191908 A1 * | 10/2003 | Cohn et al. ..................... | 711/153 |
| 2005/0060451 A1 * | 3/2005 | Laursen ........................ | 710/100 |
| 2005/0182851 A1 | 8/2005 | Buckler et al. | |

(Continued)

FOREIGN PATENT DOCUMENTS

JP     2005339528     12/2005

*Primary Examiner* — Idriss N Alrobaye
*Assistant Examiner* — Getente A Yimer
(74) *Attorney, Agent, or Firm* — Wagner Blecher, LLP; John P. Wagner, Jr.

(57) ABSTRACT

Various embodiments of a method [800] of distributing configuration information within a predefined set of conjoined blades of a blade partition are described. In one embodiment, a configuration rule at a database for a predefined set of conjoined blades of a blade partition is accessed, wherein conjoined blades within the blade partition are coupled with management processors [805]. A portion of the configuration rule is compared with a hardware configuration of the blade partition [810]. The portion of the configuration information is an identification of the conjoined blades [810]. When the portion of the configuration rule correlates with the hardware configuration, the configuration rule is provided to the management processors of the blade partition [815].

15 Claims, 13 Drawing Sheets

(56) References Cited

U.S. PATENT DOCUMENTS

| | | |
|---|---|---|
| 2005/0283549 A1 | 12/2005 | Gibson |
| 2007/0233927 A1* | 10/2007 | Fallah-Adl et al. ........... 710/301 |
| 2007/0266108 A1* | 11/2007 | Patterson et al. ............. 709/217 |
| 2008/0010364 A1 | 1/2008 | Iwanaga |
| 2008/0233800 A1* | 9/2008 | Cai et al. ...................... 439/608 |
| 2008/0244052 A1* | 10/2008 | Bradicich et al. ............. 709/223 |
| 2009/0177877 A1* | 7/2009 | Holdaway et al. ................. 713/2 |
| 2011/0124342 A1* | 5/2011 | Speks et al. ................... 455/445 |

\* cited by examiner

DOMAIN MANAGEMENT PROCESSOR

FIELD

The field of the present technology relates to blade management.

BACKGROUND

Blade servers are widely used in datacenters to save space and improve system management. They are self-contained computer servers, designed for high density. Blade servers have many components removed for space, power and other considerations while still having all the functional components to be considered a computer.

One of the principal benefits of blade computing is that components are no longer restricted to the minimum size requirements of the standard server-rack configuration. For example, densities of 100 computers per rack and more are achievable with the present blade systems. Furthermore, as more processing power, memory and I/O bandwidth are added to blade servers, they are being used for larger and more diverse workloads.

However, there exist many limitations to the current state of technology with respect to blade servers. For example, blade server configurations are fixed and only communicate through switch I/O fabrics. This method of communication does not allow for high performance while hosting a large scale symmetric multiprocessing system. Furthermore, while high end systems have the ability to aggregate cell boards by using proprietary switch I/O fabrics driven by custom ASICs and fixed large scale mid-planes, this procedure is cost prohibitive.

SUMMARY

Various embodiments of a method of distributing configuration information within a predefined set of conjoined blades of a blade partition are described. In one embodiment, a configuration rule for a predefined set of conjoined blades of a blade partition is accessed at a database, wherein conjoined blades within the blade partition are coupled with management processors. A portion of the configuration rule is compared with a hardware configuration of the blade partition. The portion of the configuration information is an identification of the conjoined blades. When the portion of the configuration rule correlates with the hardware configuration, the configuration rule is provided to the management processors of the blade partition.

Figure 1:
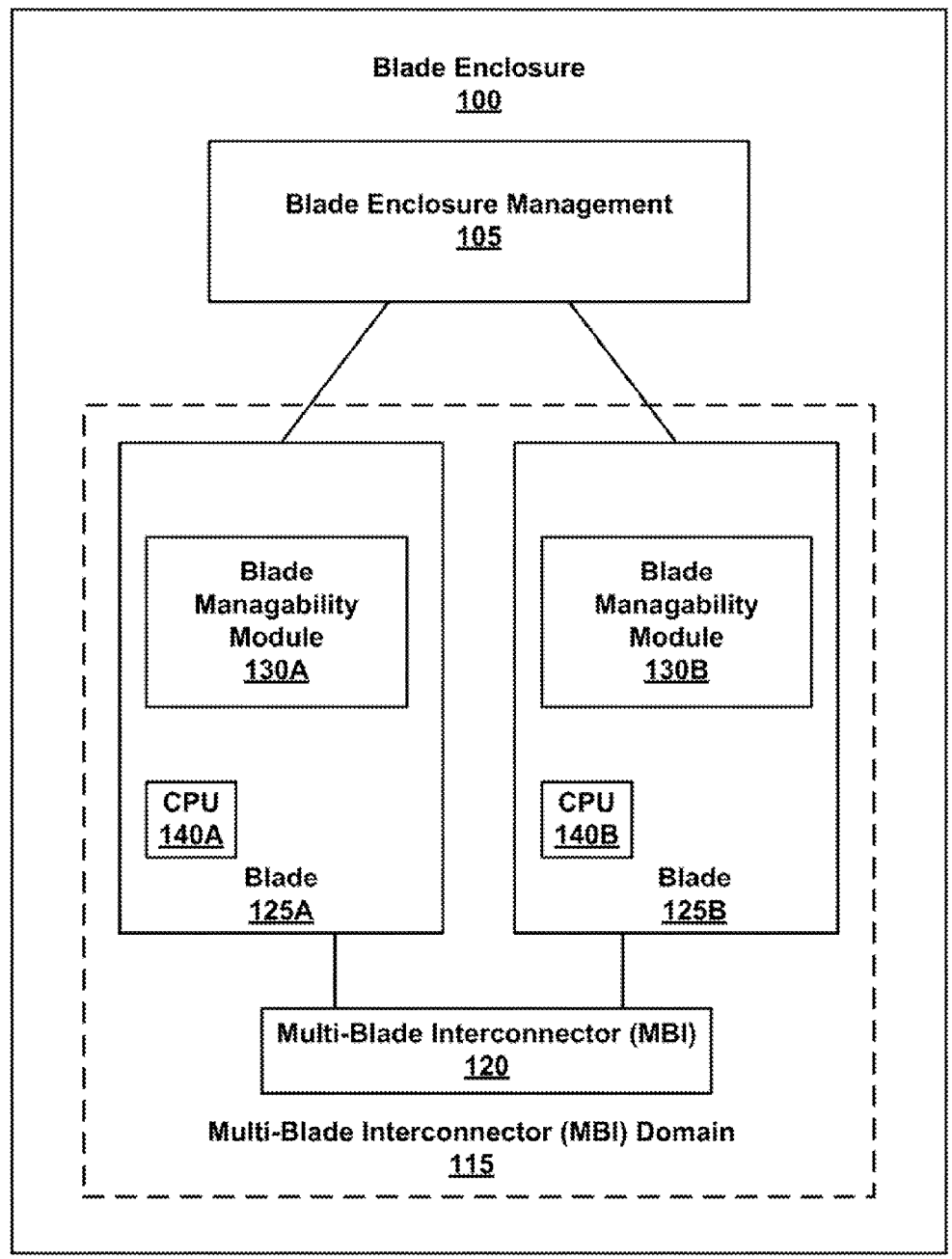
FIG. 1 is a block diagram of a blade enclosure in accordance with embodiments of the present technology.

The drawings referred to in this description should be understood as not being drawn to scale except if specifically noted.

DETAILED DESCRIPTION

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present detailed description, discussions utilizing terms such as "providing", "interconnecting", "utilizing", "configuring", "accessing", "comparing", "checking", "assuming", "storing", "relinquishing", "sending", "receiving", "initializing", "directing", or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present technology is also well suited to the use of other computer systems such as, for example, optical and mechanical computers.

Embodiments of the present technology interconnect low-cost conjoined blades to form a communication pathway.

This communication pathway enables low-cost conjoined blades to function as a single blade, while these conjoined blades host one or more operating systems. By forming a communication pathway within conjoined blades, embodiments of the present technology allow for high performance communication among multiple low-cost blades and operating systems connected therewith.

Additionally, a domain management processor provides configuration information rules to a low level intializer to enable such an interconnection. The low level intializer configures the conjoined blades according to the configuration information, thereby enabling a predefined set of electrically isolated blades to function as a single blade by utilizing a supporting communication pathway.

The discussion will begin with an overview of a multi-blade interconnector (MBI) domain according to embodiments of the present technology, and the role a multi-blade interconnector (MBI) plays within the MBI domain in establishing a communication pathway within a predefined set of conjoined blades. The discussion will then focus on embodiments and methods of the present technology that provide a communication pathway within a set of conjoined blades.

Then, the discussion will focus on a method and system of distributing configuration information within a predefined set of conjoined blades of a blade partition. Lastly, the discussion will focus on a method and system of configuring a predefined set of electrically isolated blades to function as a single blade.

With reference now to FIG. 1, a block diagram of an example blade enclosure 100 including an example MBI 120 is shown in accordance with embodiments of the present technology. Blade enclosure 100 includes blade enclosure management 105, and MBI domain 115. MBI domain 115 includes MBI 120, blade 125A, and blade 125B. MBI 120 conjoins blade 125A and blade 125B. Blade enclosure management 105 interacts with blades 125A and 125B in order to provide a management communication pathway between the conjoined blades 125A and 125B.

It should be appreciated that MBI domain 115 may include a plurality of blades beyond that of blades 125A and 125B. However, for purposes of brevity and clarity, blades 125A and 125B as referred to in this application may represent any plurality of blades within MBI domain 115. Additionally, blades 125A and 125B may be any type of blade, each blade having a special function. For example, blades 125A and 125B may be server blades, memory blades, or a combination of server blades and memory blades. MBI 120 is coupled with each of these blades, thereby tying them together.

Figure 2:
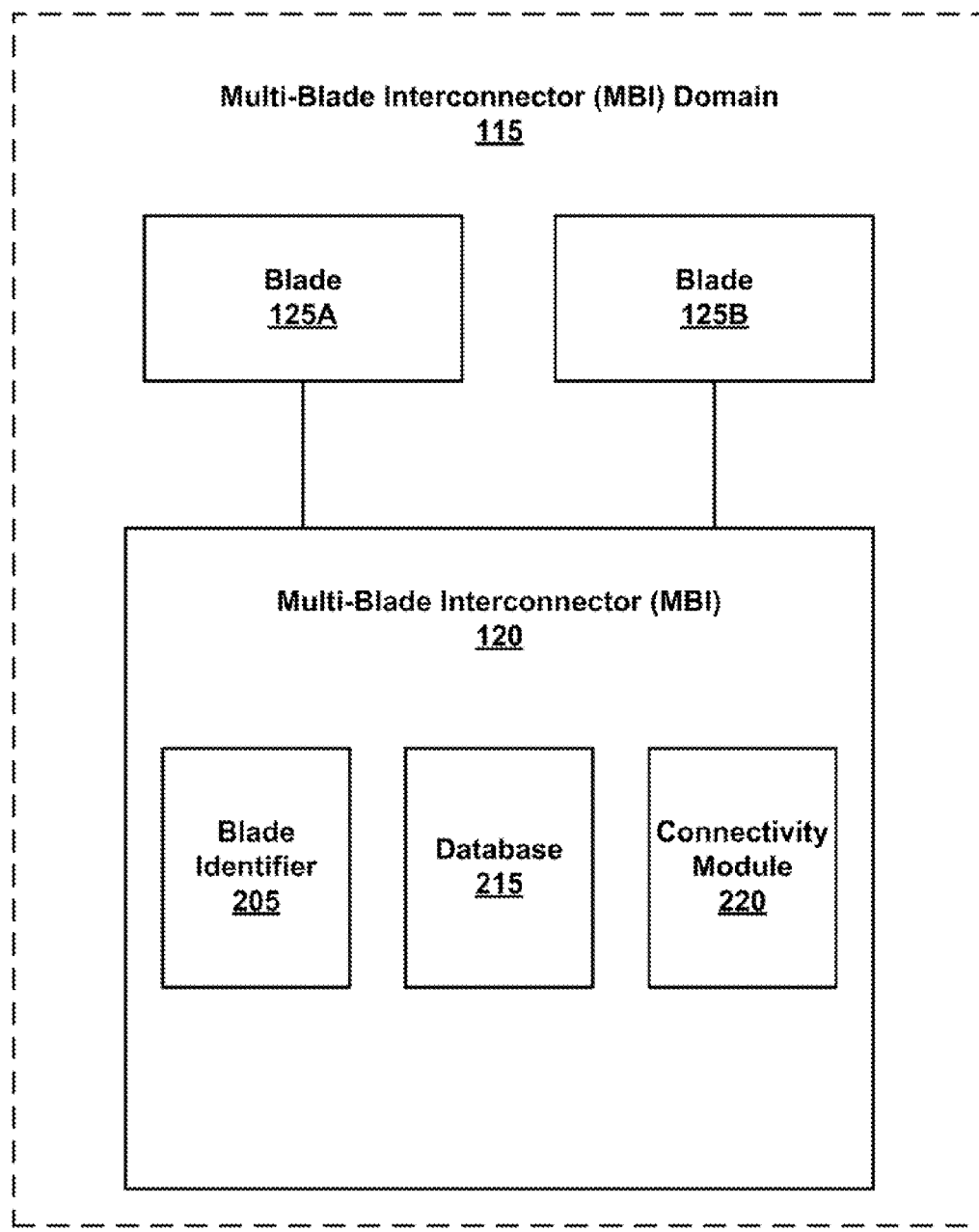
FIG. 2 is a block diagram of an example multi-blade interconnector (MBI) in accordance with embodiments of the present technology.

With reference to FIG. 2, a block diagram of an example MBI 120 within a MBI domain 115 in accordance with an embodiment of the present technology is shown. MBI domain 115 includes blades 125A and 125B and MBI 120. MBI 120 includes blade identifier 205, database 215, and connectivity module 220.

Blade identifier 205 is configured for providing an identification of blades 125A and 125B within a blade partition, wherein the blade partition is a predefined set of conjoined blades. In one embodiment, the 'predefined set of conjoined blades' refers to a predetermined desired combination of conjoined blades. The term 'blade partition' refers to the predefined set of conjoined blades. It should be appreciated that while the predetermined desired combination of conjoined blades may include a specific set of 4 blades, the desired partitioning of these 4 blades after the 4 blades have been identified and configured as described herein may be that of 4 separated blades. In other words, after the 4 conjoined blades have been identified and configured, these 4 conjoined blades may then be separated according to configuration information.

This desired combination is a particular blade design which may be related to a product definition. For example, given six blades residing within the MBI domain, the combination of blade 2, blade 4, and blade 6 may be the blade design for a certain product. Blade 2, blade 4, and blade 6 are 'predefined' to be conjoined and available for interconnecting in order to form a communication pathway within the conjoined blades, blade 2, blade 4, and blade 6. Blade identifier 205 has knowledge of this blade partition and works to identify blade 2, blade 4, and blade 6 of this blade partition. It is appreciated that the desired combination of conjoined blades described above may refer to some combination other than a product definition.

In one embodiment, an example of an 'identification' is selected from the group of identifications consisting of: presence, location, MBI type, and size. For example, blade identifier 205 may determine whether or not each blade is present of the predefined blade partition, blade 2, blade 4, and blade 6. The term 'present' refers to the existence of each of the predefined set of blades. If blade identifier 205 identifies the presence of blade 2, blade 4, and blade 6, then blade identifier 205 may signal this knowledge. In one instance, blade identifier 205 signals this identification knowledge to blade enclosure management 105. It should be appreciated that there may be other receivers of identification information other than blade enclosure management 105, e.g. the blades themselves.

It should also be appreciated that while there may be a blade partition such as blade 2, blade 4, and blade 6, in one embodiment, it may also be predetermined that information for only blades 2 and 4 will be provided. In such a case, all blades within the blade partition, such as blades 2, 4, and 6 are programmed to expect only information associated with blades 2 and 4. In other words, any information provided may be predetermined to be provided to a number of blades less than the total number of blades within the blade partition. However, for purposes of brevity and clarity, the present technology will be discussed herein in terms of providing information to every blade within a blade partition.

In another embodiment, blade identifier 205 may determine the location of each blade among a predefined set of conjoined blades. Consider an example where, out of 6 blades present (blade 1, blade 2, blade 3, blade 4, blade 5, and blade 6), blade identifier 205 identifies that blades 1, 3, and 6 are adjacent and conjoined with each other, and that blades 2, 4, and 5 are adjacent and conjoined with each other. Additionally, blade identifier 205 may identify in which slot each blade is located, such as in slot 1, slot 2, slot 3, slot 4, slot 5, slot 6, etc.

In yet another embodiment, blade identifier 205 may determine the type of MBI 120. For example, blade identifier 205 may identify MBI 120 to be a specific predefined type of MBI 120.

In one example of an embodiment, blade identifier 205 identifies the size of the MBI domain 115. For example, if there are 22 blades within a blade partition, then blade enclosure manager 105 may be informed of the number of the blades and the individual make-up of the blade set. For example, out of the predefined conjoined set of 22 blades present, there were 11 sets of 2 blades. Blade enclosure management 105 will be informed of such. Of note, other combinations of blades are possible, such as the combination of 9 sets of 2 blades and 1 set of 4 blades, etc.

Each blade 125A and 125B residing on blade enclosure 100 and coupled with MBI 120 has an address. At each attachment point between MBI 120 and blades 125A and 125B, there is a set of signaling mechanisms that use this address to, in part, identify a partition description comprising the presence of blades 125A and 125B, the location of blades 125A and 125B, the type of MBI 120, and the size of the blade partition within MBI domain 115. It should be appreciated that there may be other partition descriptions other than that mentioned herein. Additionally, in one embodiment, the signaling mechanisms are electro/mechanical. In one embodiment, the signaling mechanism is communicated to blade enclosure management 105.

MBI 120 may signal to blade enclosure management 105 that it is coupled with blades 125A and 125B, such as by indicating whether or not MBI 120 is present (installed). MBI 120 may utilize a wire or wireless signal to provide identification information. Additionally, MBI 120 provides the addressing information for each blade 125A and 125B, which enables blade enclosure management 105 to know where each blade 125A and 125B is located within MBI domain 115. As stated herein, other identification information which MBI 120 communicates to blade enclosure manager 105 includes the determination of the presence of each blade 125A and 125B and the size of the blade partition. After accessing this identification information, blade enclosure management 105 may then recognize among other things, the presence of blades 125A and 125B, the location of blades 125A and 125B, the type of MBI domain 115 in which MBI 120 is located, and the size of the blade partition within MBI domain 115.

Blade enclosure management 105 may receive certain presence, location, type, size, information, etc. Subsequent to blade enclosure management's 105 receiving this information, blade enclosure management 105 may commence its discovering process.

Consider an example where, the presence of the following blades is required as part of a blade partition: blade 1, blade 2, blade 3, blade 4, blade 5, blade 6, blade 7, and blade 8. However, only the following 6 blades out of the 8 blades are actually present: blade 2, blade 3, blade 4, blade 6, blade 7, and blade 8. The identification of blades 2, 3, 4, 6, 7, and 8 will be provided to blade enclosure manager 105. However, it is necessary for all 8 of the blades to be present before the discovery and configuration process may begin. Once all 8 blades are present, this identification of all 8 blades is signaled to blade enclosure manager 105. If and when all 8 blades are identified as present, the process of discovery and configuration may begin.

The term 'discovery' in relation to a blade refers to the acknowledgment that a certain blade is present and accessible. In the process of discovery and configuration, blade enclosure management 105 accesses the discoverable blade partition, and configures these blades to function in accordance with a product definition and requirements.

Database 215 is configured for providing configuration information, wherein the configuration information enables configuring of blades 125A and 125B according to a configuration rule. A configuration rule includes an identification of blades within a blade partition as well as configuration information. Database 215 holds unique configuration information required by each blade 125A and 125B to be configured to be part of the MBI domain 115. This configuration information specifies how each blade 125A and 125B should be configured to work together and within MBI domain 115, taking into account the product design and product information.

Database 215 disseminates the configuration information by pushing it across the full set of blades 125A and 125B that reside in the MBI domain 115. Every blade 125A and 125B which is tied together and electrically connected with MBI 120 will receive this configuration information. Thus, this configuration information that is provided by database 215 enables blade enclosure management 105 and blade manageability modules 130A and 130B to check the electrical and functional compatibility of all the blades within the MBI domain 115 and then configure and correct areas of non-compliance, as well as points of failure within the domain.

In one embodiment, the configuration information comprises a product solution. The term 'product solution' refers to a particular blade design related to a product definition. A product definition describes the blades necessary to be present within the product. In other words, the term 'product solution' refers to the necessary presence of certain blades within a predefined set of conjoined blades.

Consider an example where products A and B both require the presence of the following 5 blades: blade 1, blade 2, blade 3, blade 4, and blade 5. Product A requires the following combination of blades: blades 1, 2, and 5 must be in one group in the following order, blade 1, blade 5, blade 2; blades 3 and 4 must be in one group in the following order, blade 4, blade 3. Product B requires the following combination of blades: blades 1 and 5 must be in one group in the following order, blade 1, blade 5; blades 2, 3, and 4 must be in one group in the following order, blade 3, blade 4, blade 2. Therefore, two products A and B were created out of 5 blades according to the predefined product solutions for product A and product B. As is apparent, different permutations of the blade partition, blade 1, blade 2, blade 3, blade 4, and blade 5, are possible.

In another embodiment, configuration information comprises blade interconnection information. 'Blade interconnection information' refers to configuration information in reference to a blade's location within the blade topology. Whereas a product solution describes the combination and order of the blades required for a particular product, blade interconnection information describes how blades within the blade partition in the form of a topology are interconnected. In one embodiment, database 215 functions to recognize the interconnection between blades.

In one embodiment, configuration information comprises electrical parametric data. This data supports the intercommunication paths. In another embodiment, configuration information comprises data to supporting sideband signaling information, such as signals of resets and clocks. Blades 125A and 125B can share resets and clocks within a conjoined blade set over the MBI 120. Therefore blade manageability 130A and 130B checks for and controls the electrical and functional compatibility of each blade of the blade partition.

Connectivity module 220 is configured for providing an interconnection between conjoined blades 125A and 125B subsequent to the configuration of blades 125A and 125B. This interconnection thereby provides a communication pathway within the blade partition. Connectivity module 220 supports blade communication at a physical level within the blade partition.

Thus, embodiments of the present technology provide a system that interconnects conjoined blades within which to form a communication pathway. Multiple autonomous blades are tied together through a communications link to form a single new blade. For example, MBI 120 coupled with multiple blades forms a communication pathway, enabling the multiple blades to function as a single blade, thus generating a more efficient and higher level of performance. Additionally, the cost of providing this communication pathway while tying together multiple blades is low relative to the cost of establishing a communications link by using proprietary I/O fabrics. Thus, embodiments of the present technology provide a system that allows for high performance communication among multiple low-cost blades and operating systems therein.

Figure 3:
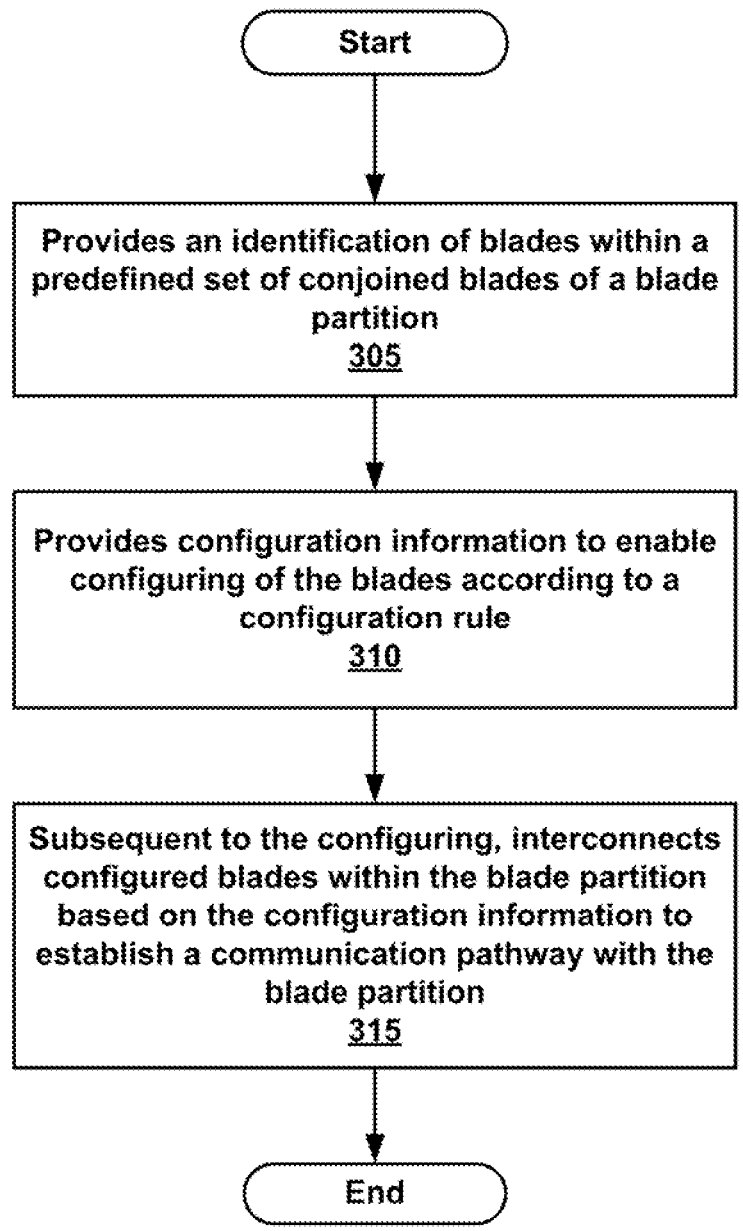
FIG. 3 is a flowchart of an example method of providing a communication pathway within a blade partition in accordance with embodiments of the present technology.

FIG. 3 is a flowchart 300 of a method of providing a communication pathway within a blade partition in accordance with embodiments of the present technology.

Referring now to 305 of FIG. 3 and as described herein, one embodiment provides an identification of blades within a blade partition. In one example, the predefined set of conjoined blades is 125A and 125B. Therefore, an identification of blades 125A and 125B is provided. In one embodiment, an electrical signal is utilized to provide an identification of blades 125A and 125B. The signal may be a wireline or wireless signal.

In one embodiment, providing an identification of blades 125A and 125B comprises providing an indication of presence of blades 125A and 125B. In another embodiment, providing an identification of each blade 125A and 125B comprises providing a location of blades 125A and 125B. In yet another embodiment, providing an identification of each blade 125A and 125B comprises providing a size of MBI domain 115.

Referring now to 310 of FIG. 3 and as described herein, one embodiment provides configuration information to enable the configuring of blades 125A and 125B according to the predefined set of conjoined blades 125A and 125B. In one embodiment, this configuration information is associated with blades 125A and 125B. Moreover, in one embodiment, the configuration information associated with each of the blades 125A and 125B is selected from an example group of partition descriptions including: product solution information, blade interconnection information, electrical parametric data, and data to support sideband signaling information. Electrical parametric data abstracts from a reference to a particular collection of electrical data.

Referring now to 315 of FIG. 3 and as described herein, subsequent to the configuring of blades 125A and 125B, one embodiment interconnects blades 125A and 125B based on the configuration information to establish a communication pathway within the blade partition.

In one embodiment, interconnecting blades 125A and 125B based on the configuration information associated with blades 125A and 125B comprises interconnecting a plurality of central processing units (CPU) 140A and 140B per an operating system. In other words, the present technology supports scaling up. For example, a growing number of CPUs per operating system may be included within MBI domain 115.

In yet another embodiment, interconnecting blades 125A and 125B based on the information associated with blades 125A and 125B comprises interconnecting a plurality of operating systems. In other words, the present technology supports scaling out. For example, there may be multiple operating systems that are tied together with a communication link.

Thus, the present technology provides a communication pathway within a blade partition. An identification of blades 125A and 125B of a blade partition is provided. Configuration information associated with blades 125A and 125B is provided. This configuration information enables the configuring of blades 125A and 125B according to a configuration rule. Then, subsequent to this configuring, blades 125A and 125B are interconnected based on the configuration information to establish a communication pathway within the blade partition.

This communication pathway within the blade partition enables blades 125A and 125B to function as one blade, enables the scaling up and scaling out of the MBI domain 115, and enables the high performance communication among low-cost blades 125A and 125B and the operating systems coupled therewith.

Example Computer System Environment

Figure 4:
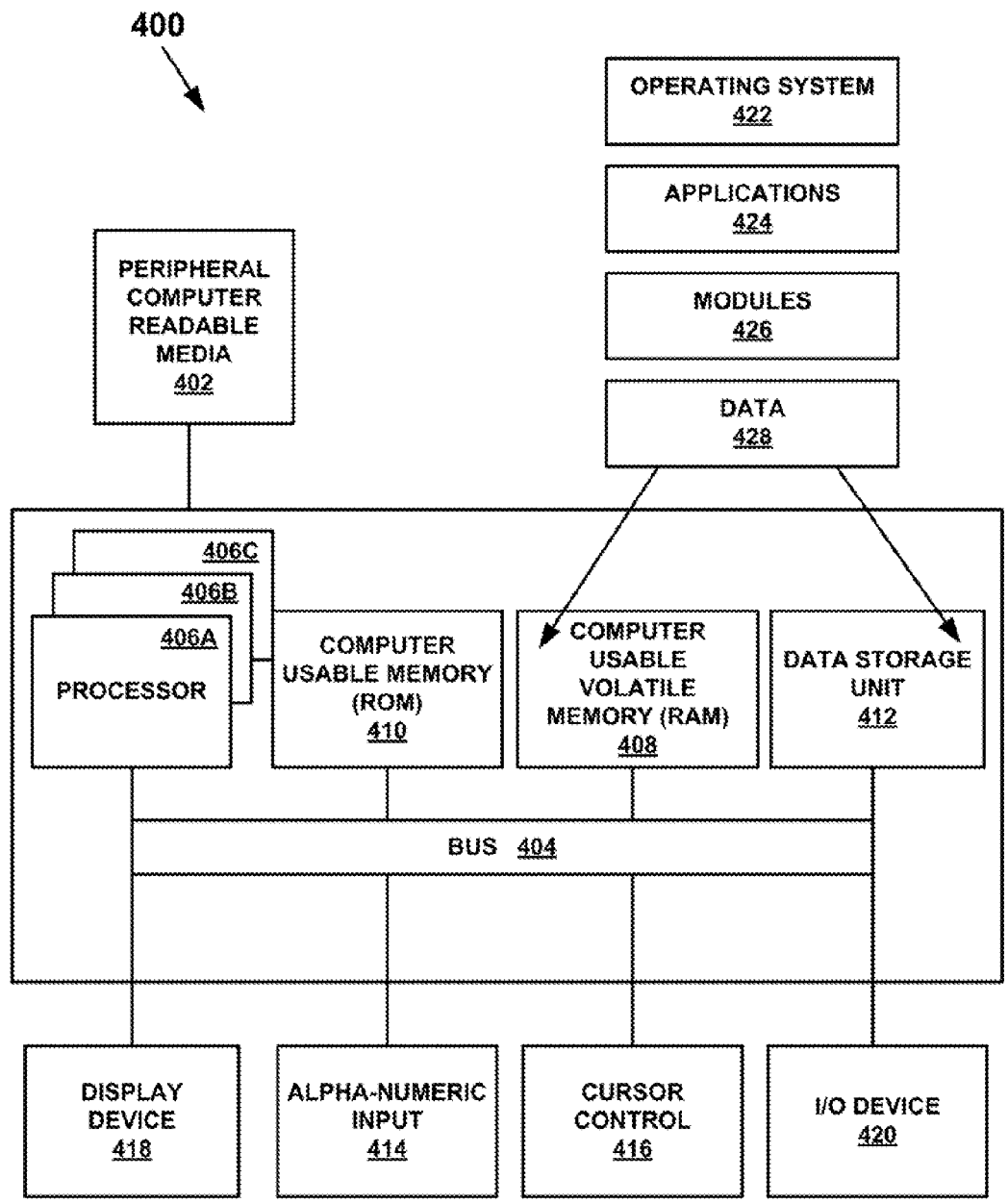
FIG. 4 is a diagram of an example computer system used for providing a communication pathway within a blade partition in accordance with embodiments of the present technology.

With reference now to FIG. 4, portions of the technology for providing a communication pathway within a set of conjoined blades are composed of computer-readable and computer-executable instructions that reside, for example, in computer-usable media of a computer system. That is, FIG. 4 illustrates one example of a type of computer that can be used to implement embodiments, which are discussed below, of the present technology.

FIG. 4 illustrates an example computer system 400 used in accordance with embodiments of the present technology. It is appreciated that system 400 of FIG. 4 is an example only and that the present technology can operate on or within a number of different computer systems including general purpose networked computer systems, embedded computer systems, routers, switches, server devices, user devices, various intermediate devices/artifacts, stand alone computer systems, and the like. As shown in FIG. 4, computer system 400 of FIG. 4 is well adapted to having peripheral computer readable media 402 such as, for example, a floppy disk, a compact disc, and the like coupled thereto.

System 400 of FIG. 4 includes an address/data bus 404 for communicating information, and a processor 406A coupled to bus 404 for processing information and instructions. As depicted in FIG. 4, system 400 is also well suited to a multi-processor environment in which a plurality of processors 406A, 406B, and 406C are present. Conversely, system 400 is also well suited to having a single processor such as, for example, processor 406A. Processors 406A, 406B, and 406C may be any of various types of microprocessors. System 400 also includes data storage features such as a computer usable volatile memory 408, e.g. random access memory (RAM), coupled to bus 404 for storing information and instructions for processors 406A, 406B, and 406C.

System 400 also includes computer usable non-volatile memory 410, e.g. read only memory (ROM), coupled to bus 404 for storing static information and instructions for processors 406A, 406B, and 406C. Also present in system 400 is a data storage unit 412 (e.g., a magnetic or optical disk and disk drive) coupled to bus 404 for storing information and instructions. System 400 also includes an optional alpha-numeric input device 414 including alphanumeric and function keys coupled to bus 404 for communicating information and command selections to processor 406A or processors 406A, 406B, and 406C. System 400 also includes an optional cursor control device 416 coupled to bus 404 for communicating user input information and command selections to processor 406A or processors 406A, 406B, and 406C. System 400 of the present embodiment also includes an optional display device 418 coupled to bus 404 for displaying information.

Referring still to FIG. 4, optional display device 418 of FIG. 4 may be a liquid crystal device, cathode ray tube, plasma display device or other display device suitable for creating graphic images and alpha-numeric characters recognizable to a user. Optional cursor control device 416 allows the computer user to dynamically signal the movement of a visible symbol (cursor) on a display screen of display device 418. Many implementations of cursor control device 416 are known in the art including a trackball, mouse, touch pad, joystick or special keys on alpha-numeric input device 414 capable of signaling movement of a given direction or manner of displacement. Alternatively, it will be appreciated that a cursor can be directed and/or activated via input from alpha-numeric input device 414 using special keys and key sequence commands.

System 400 is also well suited to having a cursor directed by other means such as, for example, voice commands. System 400 also includes an I/O device 420 for coupling system 400 with external entities.

Referring still to FIG. 4, various other components are depicted for system 400. Specifically, when present, an operating system 422, applications 424, modules 426, and data 428 are shown as typically residing in one or some combination of computer usable volatile memory 408, e.g. random access memory (RAM), and data storage unit 412. However, it is appreciated that in some embodiments, operating system 422 may be stored in other locations such as on a network or on a flash drive; and that further, operating system 422 may be accessed from a remote location via, for example, a coupling to the internet. In one embodiment, the present technology, for example, is stored as an application 424 or module 426 in memory locations within RAM 408 and memory areas within data storage unit 412.

Computing system 400 is only one example of a suitable computing environment and is not intended to suggest any limitation as to the scope of use or functionality of the present technology. Neither should the computing environment 400 be interpreted as having any dependency or requirement relating to any one or combination of components illustrated in the example computing system 400.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

Figure 5:
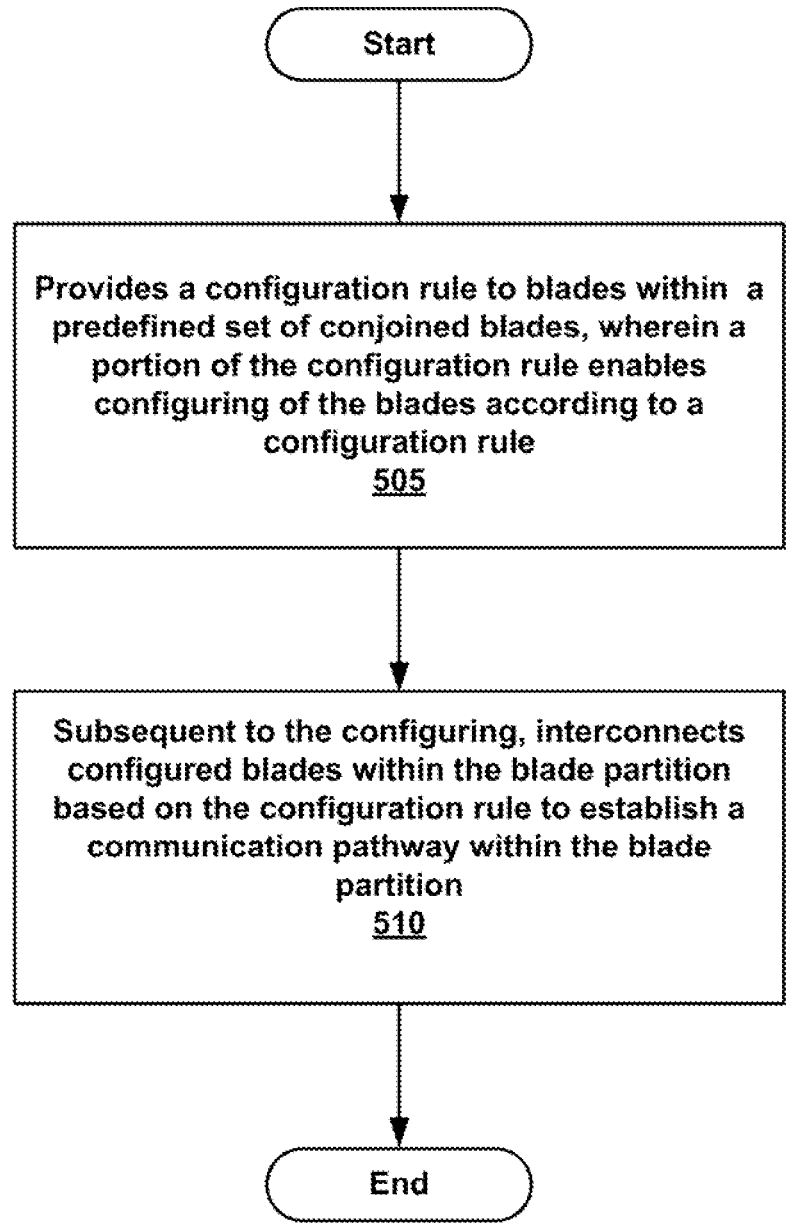
FIG. 5 is a flowchart of an example method of providing a communication pathway within a blade partition in accordance with embodiments of the present technology.

FIG. 5 is a flowchart 500 of an example method of providing a communication pathway within a predefined set of conjoined blades 125A and 125B of a blade partition in accordance with embodiments of the present technology.

Referring now to 505 of FIG. 5 and as described herein, one embodiment provides a configuration rule to blades 125A and 125B within a predefined set of conjoined blades 125A and 125B of a blade partition, wherein a portion of the configuration rule enables configuring of blades 125A and 125B according to predefined set of conjoined blades 125A and 125B. In one embodiment, providing a configuration rule comprises providing an identification of blades 125A and 125B within the predefined set of conjoined blades 125A and 125B. In another embodiment, providing a configuration rule comprises providing configuration information of blades 125A and 125B within the predefined set of conjoined blades 125A and 125B.

Referring now to 510 of FIG. 5 and as described herein, subsequent to the configuring, one embodiment interconnects configured blades 125A and 125B within the blade partition based on the configuration rule to establish a communication pathway within the blade partition.

Thus, the present technology provides a method and system of providing a communication pathway within a blade partition. Moreover, the present technology enables the set of conjoined blades 125A and 125B to behave in a unified manner. Additionally, the present technology enables the scaling up and scaling out of internal components.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

Domain Management Processor

Embodiments of the present technology provide a method of distributing configuration information within a predefined set of conjoined blades of a blade partition. Configuration information is provided to management processors of blades within a predefined set of conjoined blades. The mechanism which enables the distribution of configuration information is the domain management processor described herein.

Figure 6:
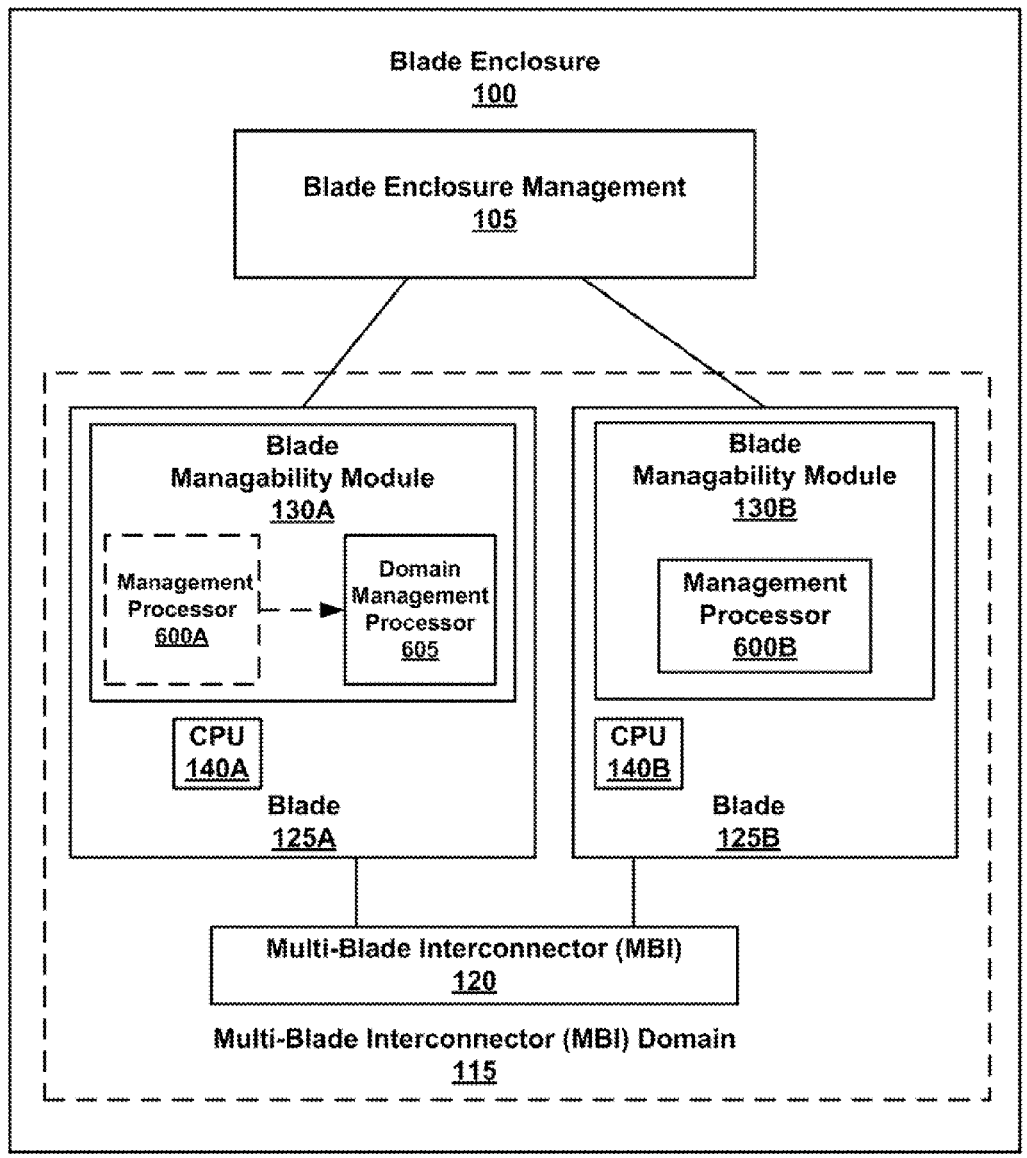
FIG. 6 is a block diagram of a blade enclosure in accordance with embodiments of the present technology.

Referring now to FIG. 6, a block diagram of an example blade enclosure 100 coupled with an example domain management processor (DMP) 605 is shown in accordance with embodiments of the present technology. As described herein, blade enclosure 100 includes blade enclosure management 105, and MBI domain 115. MBI domain includes MBI 120, blade 125A, and blade 125B. MBI 120 conjoins the predefined set of conjoined blades 125A and 125B.

Blade 125A includes blade manageability module 130A and CPU 140A. Blade manageability module 130A includes management processor (MP) 600A, which becomes DMP 605. DMP 605 provides for distributing configuration information to the predefined set of conjoined blades 125A and 125B. Blade manageability 130A includes management processor (MP) 600B.

It should be appreciated that there may be any number of blades within blade enclosure 100. Additionally, coupled with each of these blades are blade manageability modules 130A and 130B and management processors 600A and 600B components. Thus, there may also be any number of blade manageability modules and management processor components within blade enclosure 100. However, for purposes of brevity and clarity, management processors 600A and 600B are used to represent any number of management processors in accordance with the present technology, unless otherwise noted. Additionally, it is important to note that blades 125A and 125B have identical hardware and management processors 600A and 600B.

Figure 7:
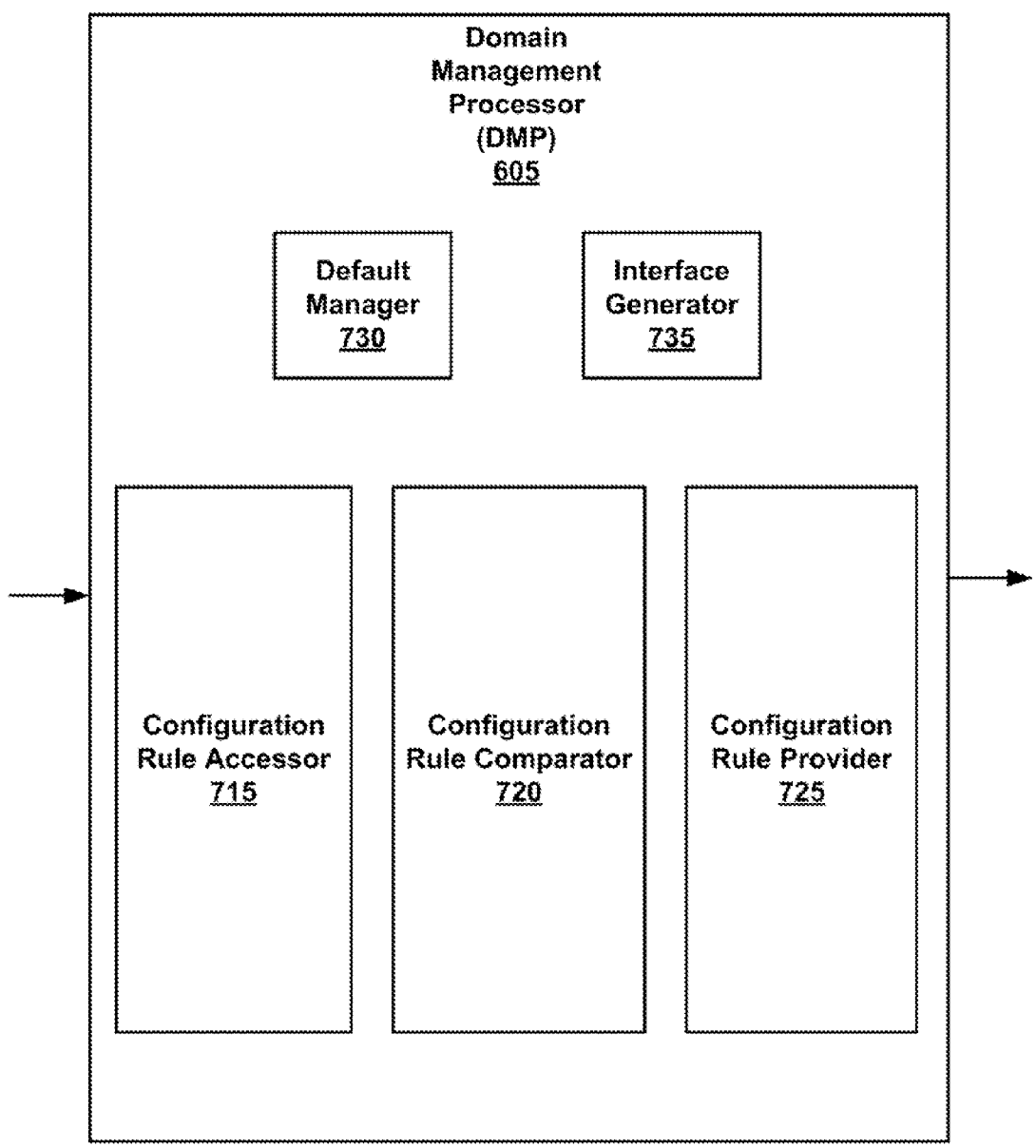
FIG. 7 is a block diagram of an example domain management processor in accordance with embodiments of the present technology.

Referring now to FIG. 7, a block diagram of an example DMP 605 is shown in accordance with embodiments of the present technology. DMP 605 includes configuration rule accessor 715, configuration rule comparator 720, configuration rule provider 725, default manager 730, and interface generator 735.

Configuration rule accessor 715 is configured for accessing a configuration rule of a predefined set of conjoined blades of a blade partition, wherein blades of the predefined set of conjoined blades are coupled with management processors. For example, if the predefined set of conjoined blades comprises blades 125A and 125B, then configuration rule accessor 715 is configured for accessing a configuration rule at a database for blades 125A and 125B. Additionally, blades 125A and 125B are coupled with management processor 600A and management processor 600B respectively.

In one embodiment, the configuration rule includes a desired position of the blades within the predefined set of conjoined blades. For example, given a predefined set of conjoined blades 125A, 125B, 125C, and 125D, the configuration rule describes where blades 125A, 125B, 125C, and 125D should be located within a blade partition relative to each other. For instance, it may be determined that all the blades 125A, 125B, 125D, and 125D are to be within the same blade partition. Moreover, the configuration rule indicates that blade 125B should be on the far left, and blade 125C should be on the far right. Blade 125A should be next to blade 125B, and blade 125D should be next to blade 125C. Consequently, blades 125A, 125B, 125C, and 125D should appear to be in the following order, 125B, 125A, 125D, and 125C.

Additionally, it is not necessary that the blades 125A, 125B, 125C, and 125D should be positioned within the same blade partition. Blades 125A, 125B, 125C, and 125D may be positioned in any number of combinations, including alone. For example, the configuration rule may indicate that blades 125A and 125C should be in one blade partition, while blades 125B and 125D should be in another blade partition.

In one embodiment, the configuration rule includes a desired blade quantity within the predefined set of conjoined blades. For example, the configuration rule may describe how many blades should be within the predefined set of conjoined blades 125A and 125B. In another instance, if the predefined set of conjoined blades consists of 125A, 125B, 125C, 125D, 125E, 125F, 125G, and 125H, then the blade quantity provides as part of the configuration rule would be the quantity of 8 blades.

In one embodiment, the configuration rule includes a type of the management processor. For example, types of management processors include but are not limited to the following: middle management blades and assistant management blades. There may be only one middle management blade per blade partition desired. Any remainder blades within a partition would be deemed assistant management blades.

The middle management blade is the leader of a blade partition. The assistant management blade is the follower within a blade partition. The middle management blade provides a user interface. Additionally, the middle management blade may provide storage for all login information. The middle management blade is coupled with the blade enclosure management 105 and aid in controlling power within blades 125A and 125B.

The assistant management blade follows the middle management. The assistant management blade participates in controlling power within blades 125A and 125B, but waits for commands from the middle management blade to do so.

In another example, if there is a blade partition containing a single blade 125A, then the middle management aspect of blade 125A will not send any information to other blades 125B, 125C, or 125D.

Consider an example where the configuration rule describes a blade partition as being a single partition of 4 blades, 125A, 125B, 125C, and 125D. Of these 4 blades 125A, 125B, 125C, and 125D, only one will be a middle management blade, and the other 3 blades would be the assistant management blades. In another example, the configuration rule describes a two-bladed partition of blades 125B and 125D, and two single partitions of blades 125A and 125C. In this case, of the two-bladed partition of blades 125B and 125D, one blade (such as 125B) is ascribed to be the middle management blade, while the other blade (such as 125D) is ascribed to be the assistant management blade. The two single partitions of blades 125A and 125C each are ascribed to be both middle management blades and assistant management blades.

In another example, the configuration rule describes the positioning and type of input/output connections available. It should be appreciated that a configuration rule may be any predetermined description associated with a blade domain set-up within blade enclosure 100 in order to function as the communication pathway described herein.

In one embodiment, prior to accessing the configuration rule for the blade partition, a management processor assumes a role as a manager of management processors. For example, given a blade partition comprising blades 125A, 125B, 125C, and 125D, a management processor of the management processors coupled with blades 125A, 125B, 125C, and 125D assumes the role of a manager of these management processors 125A, 125B, 125C, and 125D prior to any partitioning of blades 125A, 125B, 125C, and 125D.

Consider an example where management processors MPs 600A, 600B, 600C, and 600D are coupled with blade partition comprising blades 125A, 125B, 125C, and 125D respectively. One of the MPs 600A, 600B, 600C, or 600D will assume the role as the manager of the other MPs. For example, MP 600C may assume the role as the manager of MPs 600A, 600B, and 600D. MP 600C is then referred to as DMP 605.

Furthermore, MP 600C assumes the role as DMP 605 of MPs 600A, 600B, and 600D according to predetermined instructions. For example, it may be predetermined that the blades 125A, 125B, 125C, and 125D are to be positioned in the following order, 125C, 125A, 125B, and 125D. It is also predetermined that the blade that is on the far left, in this case 125C, is to contain the DMP 605 for the MPs 600A, 600B, and 600D of the blades 125A, 125B, and 125C respectively. Moreover, blades 125A, 125B, 125C, and 125D each identify themselves. For example, blade 125C would describe its position within the blade partition comprising blades 125A, 125B, 125C, and 125D, as being on the far left.

Blade 125C may know that it is on the far left because it is numbered as the lowest number of blades 125A, 125B, 125C, and 125D. For example, blade 125C may be numbered at 1 (or the first slot), while blade 125A is numbered at 2 (or the second slot), blade 125B is numbered at 3 (or the third slot), and blade 125D is numbered at 4 (or the fourth slot). It is appreciated that there are other mechanisms that blades 125A, 125B, 125C, and 125D may use to identify themselves in order to determine which MP coupled with blades 125A, 125B, 125C, or 125D is to assume the role of DMP 605.

In one embodiment, the configuration rule is stored. The configuration rule may be stored at database 215. As described herein, database 215 may be coupled internally within blade enclosure 100 or coupled external to blade enclosure 100. Additionally, the configuration rule may be stored on a component other than database 215. This component may be stored internally within blade enclosure 100 or external to blade enclosure 100.

Configuration rule comparator 720 is configured for comparing a portion of the configuration rule and a hardware configuration of the blade partition, wherein the portion is an identification of the conjoined blades. For example and as described herein, a configuration rule may include blade quantity, type of management processor 600A and 600B, and a position of blades 125A and 125B within the predefined set of conjoined blades 125A and 125B. Any of these configuration rules may be predetermined to be considered in order to check an identity of blades 125A and 125B. For instance, the positioning of blades 125A and 125B may be predetermined to be the identification that is accessed in order to determine if the identification of the blade partition comprising blades 125A and 125B correlates with the hardware configuration, as will be described herein.

In another example, the positioning and size (number of blades present) of the blade partition are considered the identification. Consequently, the positioning and size of the predefined set of conjoined blades are compared with the actual hardware configuration of the set of conjoined blades that exist. In one instance, the size of the blade partition is predetermined to be three. The positioning of the blade partition comprising blades 125A, 125B, and 125C is predetermined to be in the following order: blade 125B, blade 125A, and blade 125C. Blade 125B is to be on the far left, blade 125C is to be on the far right, and blade 125A is to be between blades 125B and 125C.

A check of the positioning of blades 125A, 125B, and 125C to determine the present order of the blades yields the following results. It is found that blades 125A, 125B, and 125C are in the following order: 125C, 125A, and 125B. Blade 125B is ascribed to be the middle management blade, while blades 125A and 125C are ascribed to be the assistant management blades. Additionally, it is confirmed that there are three blades to match the predetermined condition that there be three blades within the predefined set of conjoined blades 125A, 125B, and 125C.

In one embodiment, while comparing the identification of the blade partition comprising blades 125B, 125A, and 125C with the actual hardware configuration of the set of conjoined blades 125C, 125A, and 125B, it may be determined that the identification and the hardware configuration do not correlate.

The term "correlates" as used herein refers to matching in a predetermined manner the identification and the hardware configuration that is described herein. For example, it may be determined that blade partition comprising blades 125A, 125B, and 125C must match exactly to the hardware configuration within blade enclosure 100.

However, it may also be determined that a blade partition comprising blades 125A, 125B, and 125C may only need to partially match the hardware configuration within blade enclosure 100. For example, it may be predetermined that if any of the blades 125A, 125B, and 125C (positioned in this order) of the hardware configuration are in the position designated by the identification, then the blade partition comprising blades 125C, 125B, and 125A (positioned in this order) correlates with hardware configuration.

If the identification of the blade partition comprising blades 125B, 125A, and 125C correlates with the actual hardware configuration of the blade partition, then the configuration rule is sent to MPs 600A, 600B, and 600C, as will be described herein.

Configuration rule provider 725 is configured for sending the configuration rule to the management processors of the blade partition when the configuration rule correlates with the hardware configuration.

If the identification of blades 125A, 125B, and 125C correlates with the hardware configuration within blade enclosure 100, then the configuration rule is sent to MPs 600A, 600B, and 600C. As described herein, the configuration rule includes a type of blade to be ascribed to blades 125A, 125B, and 125C, whether it is middle management and/or assistant management. This configuration rule enables the MPs 600A, 600B, and 600C of blades 125A, 125B, and 125C respectively to configure themselves according to their predetermined positioning and function within a particular partition. For example, MPs 125A, 125B, and 125C may be slotted to be a certain type of blade, such as a middle management and/or assistant management, depending upon their location and grouping within a blade domain of blade partitions of a group of blades 125A, 125B, and 125C.

In one embodiment, default manager 730 is configured for relinquishing a role as DMP if the configuration rule is not made available to the management processors. For example, of the MPs 600B, 600C, 600D, and 600E, MPs 600B, 600C, and 600D may receive the configuration rule from DMP 605 (which was MP 600A) while MP 600E does not. In response to MP 600E not receiving the configuration rule, one of MPs 600B, 600C, 600D, and 600E will then assume the role of DMP 605, while the current DMP 605 (MP 600A) relinquishes its role as DMP 605.

Consider an example where blades 125A, 125B, 125C, and 125D (appearing in this order, and numbered 1, 2, 3, and 4 respectively) will identify themselves and their position within blade partition comprising blades 125A, 125B, 125C, and 125D. MPs 600B, 600C, and 600D are coupled with blades 125B, 125C, and 125D respectively. In one example, blades 125A, 125B, 125C, and 125D are predetermined to understand that the lowest numbered blade is positioned at the far left and is to assume the role of the DMP 605. MPs 600B, 600C, and 600D know that they are not coupled with the lowest numbered blade, and consequently assume that the MP that is coupled with the lowest numbered blade will assume the role of DMP 605.

After identifying its own positions within blade partition comprising blades 125A, 125B, 125C, and 125D and assuming that another MP assumed the role as DMP 605, blades 125B, 125C, and 125D start a time-out counter. If blades 125B, 125C, and 125D do not receive a configuration rule within a predetermined amount of time, then blades 125B, 125C, and 125D will assume that the current DMP is non-functional. The MP coupled with the next lowest numbered blade will then assume the role as DMP 605. In this case, MP 600B, coupled with blade 125B will assume the role as DMP 605.

In one example, the time-out count might be a predetermined multiple of 20 seconds, based on the slot number. For example, blade 125B in slot 2 will wait a total of 40 seconds before it assumes that the DMP is non-functional and blade 125B then assumes the role of DMP 605. Blade 125C in slot 3 will wait a total of 60 seconds before it assumes that the DMP is non-functional and blade 125C then assumes the role of DMP 605. Blade 125D in slot 4 will wait a total of 80 seconds before it assumes that the DMP is non-functional and blade 125D then assumes the role of DMP 605. Additionally, by default the time-out count may be predetermined to be zero seconds.

Interface generator 735 is configured for providing an interface for making partitioning changes when the configuration rule correlates with the hardware configuration. For example, an interface is generated based upon a blade partition comprising blades 125A, 125B, 125C, and 125D. DMP 605 interfaces with MPs 600A and 600B in order to send a configuration rule to MPs 600A and 600B.

In one embodiment, a user may interact with this interface in order to reconfigure blades 125A, 125B, 125C, and 125D, such as to instruct repositioning and/or repartitioning. For example, the user may instruct blades 125A, 125B, and 125D which are combined into a partition, to break apart and create a two-bladed partition of 125A and 125B, and a single partition of 125C. In another embodiment, an interface is provided which is separate from the interface generated by interface generator 735. A user may interact with this separate interface.

In one embodiment, the management processors of the blades are provided an updated configuration rule via the repetition of the method of distributing configuration information to the blade partition comprising blades 125A and 125B described herein.

Figure 8:
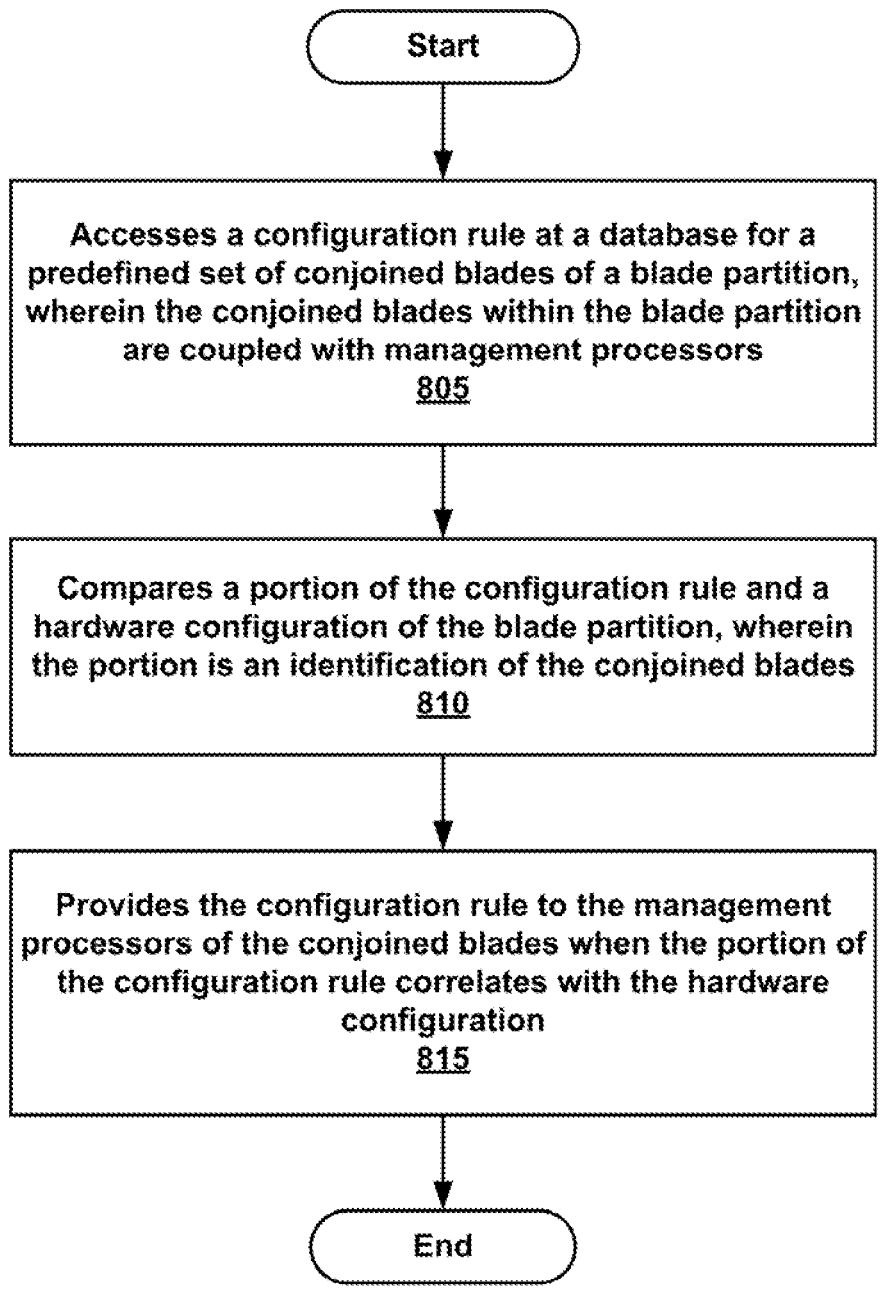
FIG. 8 is a flowchart of an example method of distributing configuration information within a blade partition in accordance with embodiments of the present technology.

FIG. 8 is a flowchart 800 of a method of distributing configuration information within a predefined set of conjoined blades of a blade partition in accordance with embodiments of the present technology.

Referring now to 805 of FIG. 8 and as described herein, one embodiment accesses a configuration rule for a blade partition comprising blades 125A and 125B of a blade partition. Blades 125A and 125B within the blade partition are coupled with management processors 600A and 600B.

Referring now to 810 of FIG. 8 and as described herein, one embodiment compares a portion of the configuration rule and the hardware configuration of the blade partition. In one embodiment, the portion of the configuration rule is an identification of blades 125A and 125B.

Referring now to 815 of FIG. 8 and as described herein, one embodiment provides the configuration rule to the MPs 600A and 600B of the blade partition when the portion of the configuration rule correlates with the hardware configuration.

Figure 9:
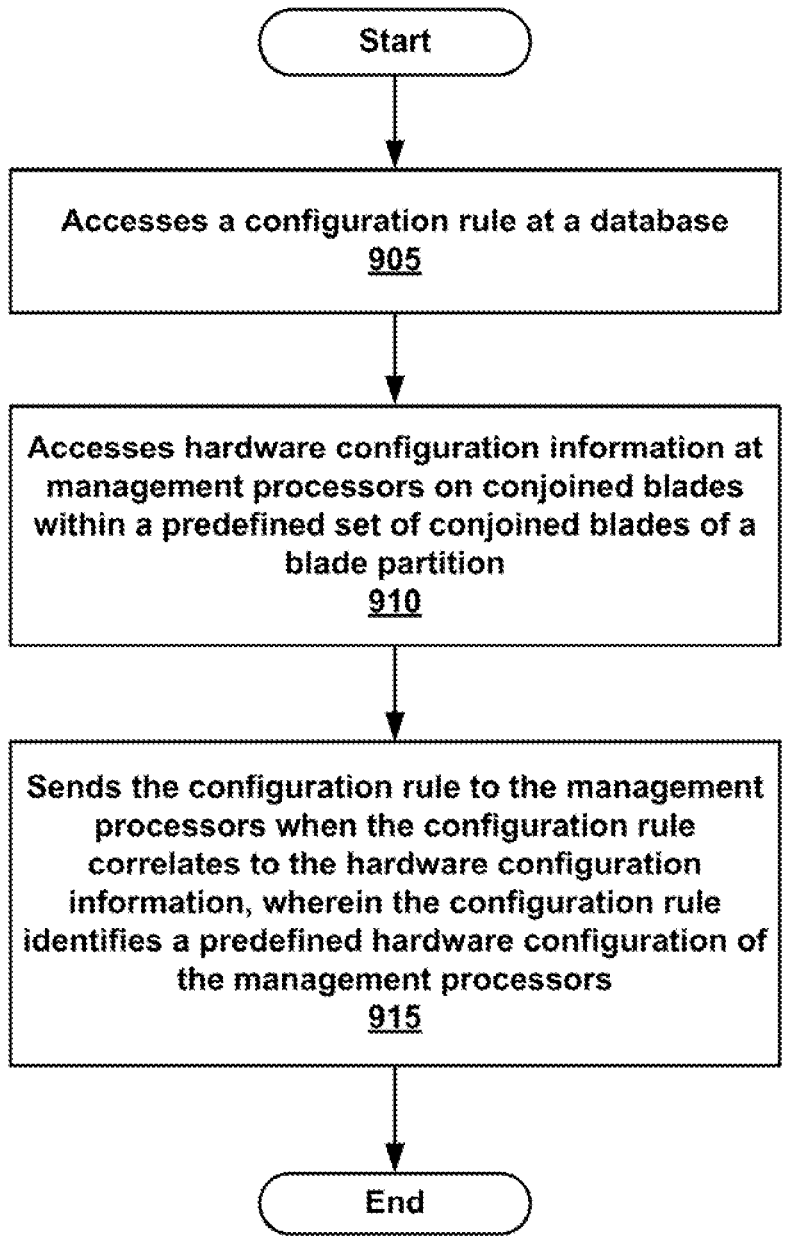
FIG. 9 is a flowchart of an example method of distributing configuration information to a blade partition in accordance with embodiments of the present technology.

FIG. 9 is a flowchart 900 of an example method of distributing configuration information to a predefined set of conjoined blades comprising a blade partition. In one embodiment, the process illustrated by flow chart 900 comprises computer-readable/computer-useable instructions stored on a computer-readable medium, such as RAM, ROM, diskette, and/or other tangible computer-readable medium. The instructions, when executed cause a computer (e.g., computer system 400 or other computer system) to perform the processes described by flowchart 900.

Referring now to 905 of FIG. 9 and as described herein, one embodiment accesses a configuration rule at a database.

Referring now to 910 of FIG. 9 and as described herein, one embodiment accesses hardware configuration information at MPs 600A and 600B on conjoined blades 125A and 125B respectively within a blade partition comprising blades 125A and 125B.

Referring now to 915 of FIG. 9 and as described herein, one embodiment sends the configuration rule to MPs 600A and 600B when the configuration rule correlates to the hardware configuration information. The configuration rule identifies a predefined hardware configuration of MPs 600A and 600B. For example, through identifying information such as positioning information associated with a blade partition comprising blades 125A and 125B, the positioning of blades 125A and 125B associated with the hardware configuration of blades 125A and 125B is also identified.

In one embodiment, DMP 605 receives partitioning changes. For example, a partition is comprised of blades 125A, 125B, and 125C. DMP 605 may receive a request to change the partition of blades 125A, 125B, and 125C to be a two-bladed partition comprising blades 125A and 125B, and a single partition of blade 125C. These partitioning changes may originate from a user directly, from a component internal to DMP 605 and preprogrammed to provide partitioning changes, and/or from a component external to DMP 605.

In one embodiment, the partitioning changes are stored. These partitioning changes may be stored internally within DMP 605 or external to DMP 605.

Thus, DMP 605 enables internal management of blades 125A and 125B by setting up the MBI domain 115 in accordance with a blade partition comprising blades 125A and 125B. In other words, DMP 605 enables partition management of the MBI domain 115.

Low Level Initializer

Embodiments of the present technology configure a predefined set of electrically isolated blades to function as a single blade. Each blade within the predefined set of blades is assigned a management role for which it is configured to support. Additionally, resources are configured to be shared among the predefined set of blades. Once the blades of the predefined set of blades are correctly configured, the power is turned on and the blades are reset to coordinate the blades' operations. Embodiments of the present technology enable the sharing and the synchronization of resources within a predefined set of conjoined blades of a blade partition. Consequently, while originally electrically isolated, separate blades may be conjoined and partitioned into various permutations. These partitioned blades may then be configured to communicate and operate as a single blade.

Figure 10:
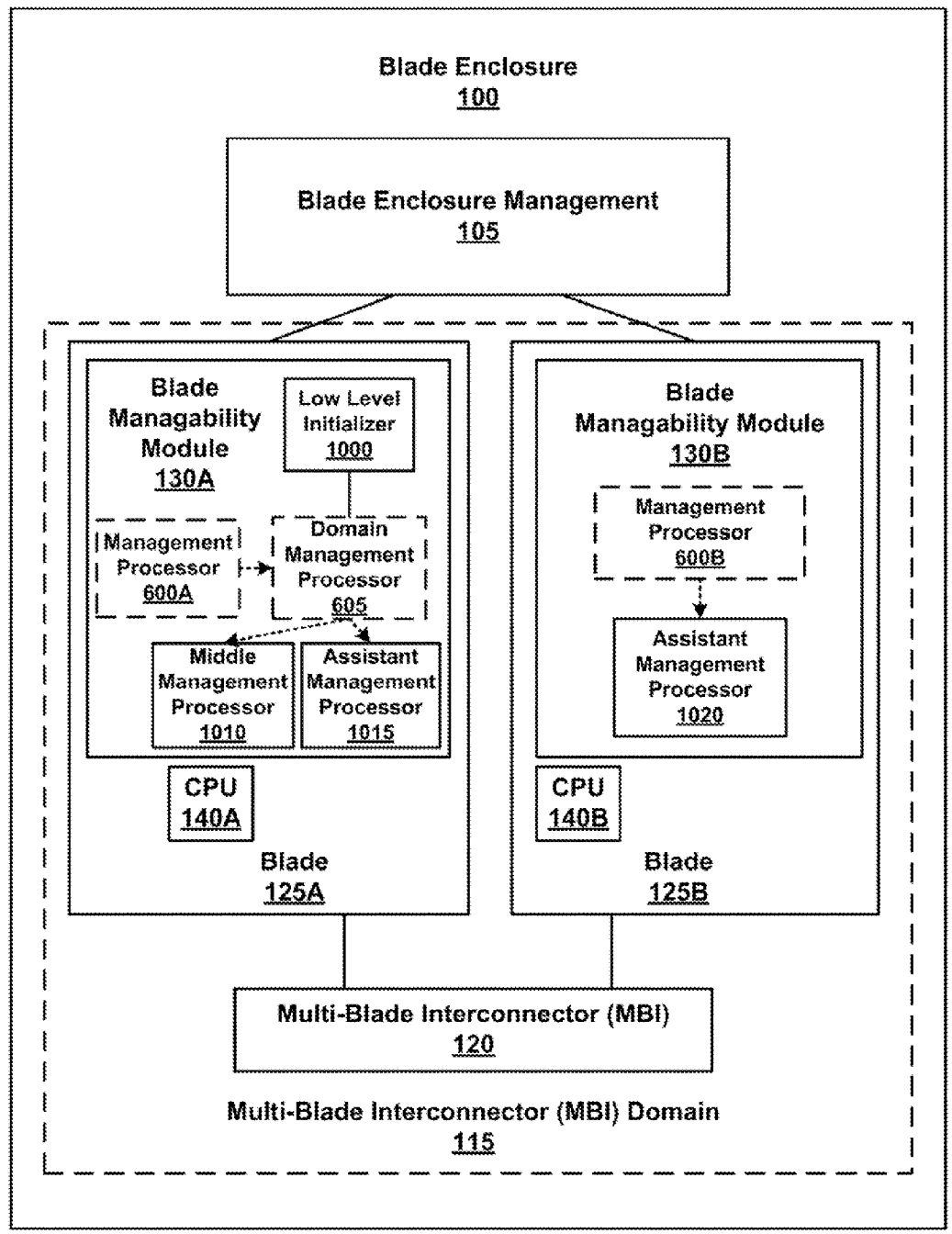
FIG. 10 is a block diagram of a blade enclosure in accordance with embodiments of the present technology.

Referring now to FIG. 10, a block diagram of an example blade enclosure 100 coupled with an example low level initializer (LLI) 1000 is shown in accordance with embodiments of the present technology. As described herein, blade enclosure 100 includes blade enclosure management 105, and MBI domain 115. MBI domain 115 includes MBI 120, blade 125A, and blade 125B. MBI 120 conjoins the predefined set of conjoined blades 125A and 125B.

Blade 125A includes blade manageability module 130A and CPU 140A. Blade manageability module 130A includes management processor (MP) 600A, which assumes the role of DMP 605. MP 600A that assumes the role of DMP 605, then becomes a middle management processor (MMP) 1010 and an assistant management processor (AMP) 1015. Blade manageability module 130A also includes LLI 1000. LLI 1000 provides a method of configuring a predefined set of electrically isolated blades to function as a single blade within a blade partition. LLI 1000 is coupled with blade manageability module 130A and DMP 605 either internally within or external to blade manageability module 130A. Additionally, in one embodiment, it should be appreciated that there is only one LLI 1000 per blade partition.

Blade 125B includes blade manageability module 130A and CPU 140B. Blade manageability module 130B includes MP 600B which becomes AMP 1020.

It should be noted that the term "blade partition" refers to a predefined set of conjoined blades within MBI domain 115. For purposes of brevity and clarity, the set of blades 125A and 125B will be used as the predefined set of conjoined blades 125A and 125B. However, the phrase, "predefined set of conjoined blades" refers to a set of conjoined blades necessary to be present in order to accomplish the intended permutations of the predefined set of conjoined blades as defined by a configuration rule. Additionally, any intended permutation may include any number of blades of the predefined set of conjoined blades. For example, of a predefined set of 4 conjoined blades, a permutation may include a blade partition of just one isolated blade and a blade partition of 3 conjoined blades.

Figure 11:
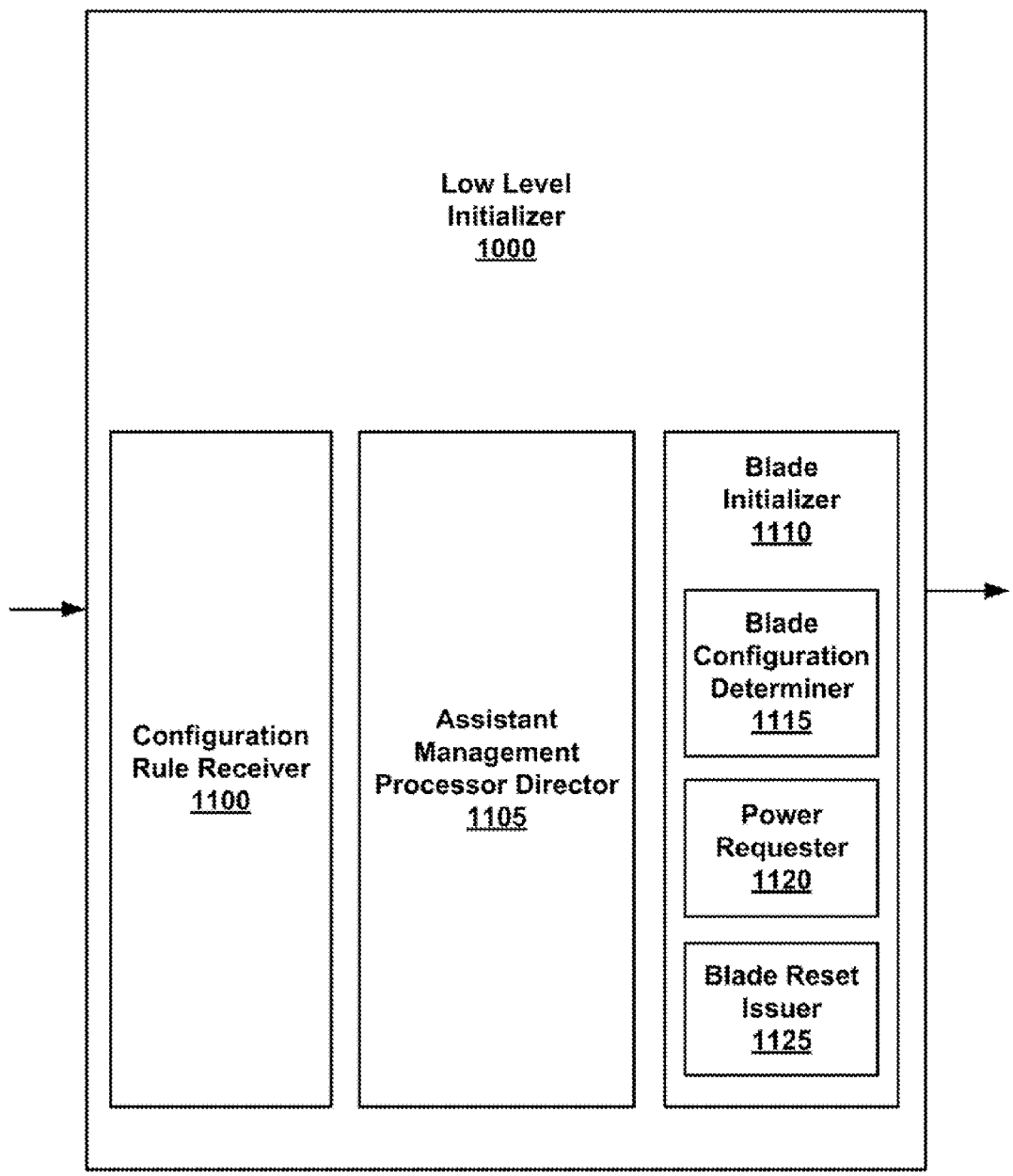
FIG. 11 is a block diagram of an example low level initializer in accordance with embodiments of the present technology.

Referring now to FIG. 11, a block diagram of an example LLI 1000 is shown in accordance with embodiments of the present technology. LLI 1000 includes configuration rule receiver 1100, assistant management processor director 1105, and blade initializer 1110. Blade initializer 1110 includes blade configuration determiner 1115, power requester 1120, and blade reset issuer 1125. It should be noted that in one embodiment LLI 1000 operates through a peer to peer local area network that is incorporated throughout blade enclosure 100.

Additionally, MBI 120 provides the conduit for the operation of LLI 1000. Moreover, LLI 1000 directs blades 125A and 125B to enable communication across each resultant blade partition defined via the configuration rule.

Configuration rule receiver 1100 is configured for receiving a configuration rule defining a particular configuration of blades to be conjoined within a blade partition. For example, configuration rule receiver 1100 receives a configuration rule that defines a particular configuration of blades 125A and 125B to be conjoined within a blade partition consisting of blades 125A and 125B.

In one embodiment, the configuration rule includes defined roles of management processors. For instance, a defined role of a management processor is that of a middle management processor (MMP). Another example of a defined role of a management processor is that of an assistant management processor (AMP).

Assistant management processor (AMP) director 1105 is configured for directing an assistant management processor (AMP) to configure blades to be conjoined according to the configuration rule. For example, AMP director 1105 directs an AMP to configure blades 125A and 125B to be conjoined according to a configuration rule.

In one embodiment, AMPs are directed to configure blade manageability modules to support assigned roles to management processors. The blade manageability modules are coupled with the management processors. For example, blade 125A is assigned a role as an MMP. In other words, blade 125A has an MMP personality. Blade 125B is assigned a role as an AMP. In other words, blade 125B has an AMP personality. Blade manageability module 130A is coupled with MP 600A, while blade manageability module 130B is coupled with MP 600B.

In one embodiment, according to a configuration rule, MP 600A is assigned a role as an MMP 610 and an AMP 615. AMP 615 is directed to configure blade manageability module 130A to support blade 125A as having an MMP 610 role and an AMP 615 role. According to the configuration rule, MP 600B is assigned a role as an AMP 620. AMP 620 is directed to configure blade manageability module 130B to support blade 125B as having an AMP 620 role.

In one embodiment, AMPs are directed to configure blade manageabilities to support the roles assigned by the configuration rule by re-ordering the conjoined blades according to the configuration rule to match the blade partition. For example, a configuration rule indicates that a blade partition defines the predefined set of conjoined blades to be conjoined in the following order: blade 125B is assigned an MMP and AMP personality, blade 125A is assigned an AMP personality, blade 125D is assigned an AMP personality, and blade 125C is assigned an AMP personality. However, the existing order of the blades is blade 125A, blade 125B, blade 125C, and blade 125D. The AMPs on each of the blades 125A, 125B, 125C, and 125D re-order the blades to match the predefined order, 125B, 125A, 125D, and 125C.

In another embodiment, the AMPs are directed to configure blade manageability modules to support the roles assigned by the configuration rule by dividing the conjoined blades into multiple permutations according to the configuration rule. For example, taking a 4 blade domain prior to partitioning, there is blade 1, blade 2, blade 3, and blade 4. Blade 1 assumes the role as the DMP, while blades 2, 3, and 4 become AMPs.

Consider the example where the configuration rule defines 5 different permutations of partitioning for blades 1, 2, 3, and 4. Permutation 1 defines the blade partition to be a set of conjoined blades such that blades 1, 2, 3, and 4 are conjoined with each other. Blade 1 is assigned the role of an MMP and an AMP, while blades 2, 3, and 4 are each assigned the role of an AMP.

Permutation 2 defines the blades to be divided into 2 separate blade partitions of conjoined blades. The first blade partition includes conjoined blades 1 and 2. The second blade partition includes conjoined blades 3 and 4. Blade 1 is assigned the role of an MMP and an AMP. Blade 2 is assigned a role of an AMP. Blade 3 is assigned the role of an MMP and an AMP. Blade 4 is assigned the role of an AMP. It should be noted that for each blade partition, only one blade is assigned the role of an MMP, while all the blades are assigned the role as an AMP.

Permutation 3 defines the blades to be divided into 3 separate blade partitions of conjoined blades. It should be once again noted that blades are referred to as a "set of conjoined blades" before any possible re-ordering described herein has been accomplished. The first blade partition includes the blades 1 and 2. The second blade partition includes just blade 3. The third blade partition includes just blade 4. Blade 1 is assigned the role as an MMP and an AMP. Blade 2 is assigned the role as an AMP. Blade 3 is assigned the role as an MMP and an AMP. Blade 4 is assigned the role as an MMP and an AMP.

Permutation 4 defines the blades to be divided into 3 separate blade partitions of conjoined blades. The first blade partition includes just blade 1. The second blade partition includes just blade 2. The third blade partition includes blades 3 and 4. Blade 1 is assigned the role as an MMP and an AMP. Blade 2 is assigned the role as an MMP and an AMP. Blade 3 is assigned the role as an MMP and an AMP. Blade 4 is assigned the role as an AMP.

Permutation 5 defines the blades to be divided into 4 separate blade partitions of conjoined blades. The first blade partition includes just blade 1. The second blade partition includes just blade 2. The third blade partition includes just blade 3. The fourth blade partition includes just blade 4. Blade 1 is assigned the role as an MMP and an AMP. Blade 2 is assigned the role as an MMP and an AMP. Blade 3 is assigned the role as an MMP and an AMP. Blade 4 is assigned the role as an MMP and an AMP.

In another embodiment, AMPs are directed to configure resources to be shared across the blade partition according to the configuration rule. Resources to be shared across the blade partition may include but are not limited to clocks and resets. For example, of a blade partition of conjoined blades 125A and 125B, a clock coupled with blade 125A may be shared across the blade partition with blade 125B so that blades 125A and 125B may be synchronized and operate as a single server. In other words, once a clock from one blade 125A is identified to be shared, MMP 1010 routes this clock to every other blade 125B within the predefined set of conjoined blades 125A and 125B such that this clock may be utilized by both blades 125A and 125B.

Blade initializer 1110 initializes conjoined blades after determining that the conjoined blades are configured according to the configuration rule. For example, blade initializer 1110 initializes conjoined blades 125A and 125B after determining that the conjoined blades 125A and 125B are configured according to the configuration rule. In one embodiment, the blade which has been assigned the MMP role is the blade which includes the LLI 1000. For example, blade 125A, assigned the MMP 1010 role includes LLI 1000.

In one embodiment, MMP 1010 is the primary access point for both the user and the ecosystem of blade enclosure 100 and beyond. For example, when the user wants to log into the system and use it, the user accesses the system on the blade which includes MMP 1010. In this case, the user would access blade 125A, which includes MMP 1010. The user may access MMP 1010 to power up and power down the hard partition. Additionally, the user may access MMP 1010 to issue a reset. The user may access MMP 1010 to issue a reset and/or to re-order blades 125A and 125B in order to fulfill a new product design.

In one embodiment, blade initializer 1110 is coupled with blade configuration determiner 1115. Blade configuration determiner 1115 is configured for determining if the conjoined blades are configured according to a configuration rule. For example, blade configuration determiner 1115 determines if conjoined blades 125A and 125B are configured according to a configuration rule. In other words, a positive determination that conjoined blades are configured according to the configuration rule is accessed.

For example, a four blade domain of conjoined blades before partitioning is made up of blades 1, 2, 3, and 4. The configuration rule defines the blades to be partitioned into 2 sets of 2 blades per blade partition. Blades 1 and 2 are in the first partition. Blades 3 and 4 are in the second partition. Blade 1 is assigned the role of an MMP and an AMP. Blade 2 is assigned a role as an AMP. Blade 3 is assigned a role as an MMP and an AMP. Blade 4 is assigned a role as an AMP. Additionally, a separate blade manageability module is coupled with each of blades 1, 2, 3, and 4. The AMPs for each of blades 1, 2, 3, and 4 are directed to configure the blade manageabilities for blades 1, 2, 3, and 4 to support the roles assigned to blades 1, 2, 3, and 4.

Blade configuration determiner 1115 determines if the previously conjoined blades 1, 2, 3, and 4 are configured according to the configuration rule definition. If blades 1, 2, 3, and 4 are configured according to the configuration rule definition, then blade configuration determiner 1115 accesses a positive determination. If blades 1, 2, 3, and 4 are not configured according to the configuration rule definition, then blade configuration determiner 1115 does not access a positive determination. In this situation, blade configuration determiner 1115 may be configured to access a negative determination, or to access a non-determination. The term "non-determination" may refer to a determination that renders no information regarding whether or not blades 1, 2, 3, and 4 are configured according to the configuration rule definition.

Additionally, blade configuration determiner 1115 determines if blades 1, 2, 3, and 4 have thereon the assigned personality of an MMP and/or an AMP. In one embodiment, the MMP of blade 1 will identify itself to the blade configuration determiner 1115. It is determined that blade 1 includes the appropriate personality according to a configuration rule defining each personality per blade.

Additionally, blade configuration determiner 1115 determines whether other resources are configured according to the configuration rule. These resources may include but are not limited to input/output resources for each of the blades 125A and 125B, and CPUs 140A and 140B of blades 125A and 125B respectively.

In another embodiment, blade initializer 1110 is coupled with power requester 1120. Power requester 1120 requests electrical power when conjoined blades have been determined to be configured according to a configuration rule. For example, power requester 1120 requests electrical power when conjoined blades 125A and 125B have been determined to be configured according to a configuration rule.

In one embodiment, blade initializer 1110 is coupled with blade reset issuer 1125. Blade reset issuer 1125 issues a reset of all conjoined blades within the blade partition after receiving electrical power. For example, blade reset issuer 1125 issues a reset of all conjoined blades (e.g., blades 125A and 125B) within the blade partition after receiving electrical power. The reset has the effect of synchronizing all blades 125A and 125B to start at a given point in time.

It should be noted that not all blades 125A and 125B may be synced to be reset at exactly the same time. It may be that blades 125A and 125B are synced to be reset at approximately the same time. The approximate reset time for each blade 125A and 125B is a function of design of blades 125A and 125B themselves.

It should be noted that configuration rule receiver 1100 and assistant management processor director 1105 operate during standby mode. In other words, configuration rule receiver 1100 and assistant management processor director 1105 operate when the conjoined blades 125A and 125B are powered down. No high level code is executing during a powered down state. However, blade manageability modules 130A and 130B are still powered on. After it is determined that blades 125A and 125B are configured according to the configuration rule, then the hard partition is activated through blade initializer 1110.

Thus, embodiments of the present technology configure a predefined set of electrically isolated blades into a hard partition containing all blades 125A and 125B within the MBI domain 115, wherein each hard partition is tied together electrically and independently physically isolated from each other. These hard partitions may be re-ordered dynamically and automatically, or in response to a user instruction. Once the power for each hard partition is turned on and a reset is issued, blades 125A and 125B are then ready to fetch code.

Figure 12:
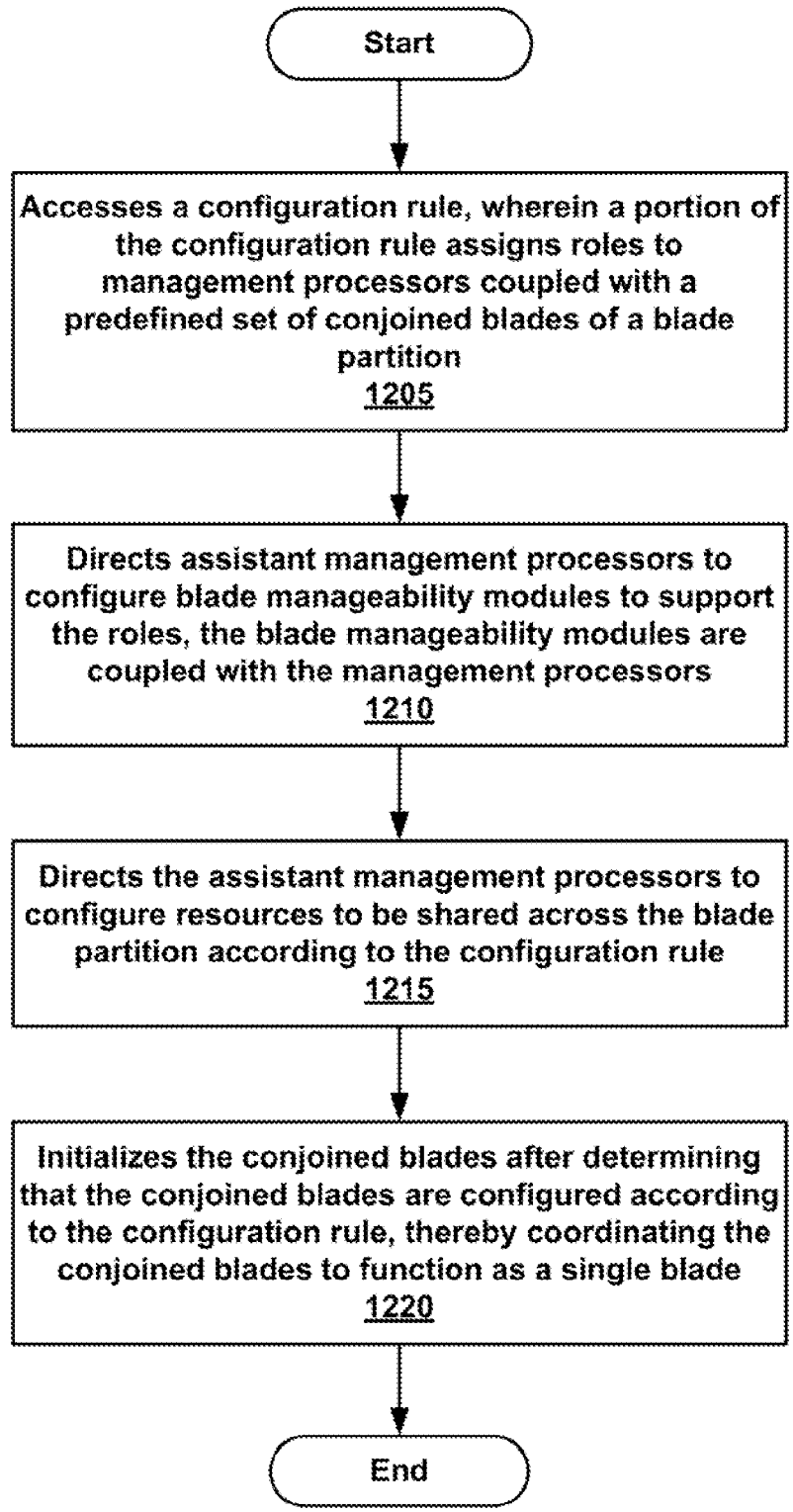
FIG. 12 is a flowchart of an example method of configuring a predefined set of electrically isolated blades to function as a single blade within a blade partition in accordance with embodiments of the present technology.

FIG. 12 is a flowchart 1200 of an example method of configuring a predefined set of electrically isolated blades 125A and 125B to function as a single blade in accordance with embodiments of the present technology.

Referring now to 1205 of FIG. 12 and as described herein, one embodiment accesses a configuration rule, wherein a portion of the configuration rule assigns roles to MPs 600A and 600B coupled with a predefined set of conjoined blades 125A and 125B of a blade partition.

Referring now to 1210 of FIG. 12 and as described herein, one embodiment directs AMPs to configure blade manageability modules 130A and 130B to support the assigned roles, the blade manageability modules 130A and 130B are coupled with MPs 600A and 600B. As described herein, one embodiment directs AMPs to configure blade manageability modules 130A and 130B to support the assigned roles by re-ordering the conjoined blades 125A and 125B according to the configuration rule to match the blade partition. As described herein, another embodiment directs the AMPs to configure blade manageabilities 130A and 130B to support the assigned roles by dividing the conjoined blades 125A and 125B into multiple permutations according to the configuration rule.

Referring now to 1215 of FIG. 12 and as described herein, one embodiment directs AMPs to configure resources to be shared across the blade partition according to the configuration rule.

Referring now to 1220 of FIG. 12 and as described herein, one embodiment initializes the conjoined blades 125A and 125B after determining that conjoined blades 125A and 125B are configured according to the configuration rule, thereby coordinating the conjoined blades 125A and 125B to function as a single blade. As described herein, one embodiment accesses a positive determination that conjoined blades 125A and 125B are configured according to the configuration rule. As described herein, one embodiment requests electrical power.

Thus, the present technology provides a method and system of configuring a predefined set of electrically isolated blades 125A and 125B to function as a single blade.

Figure 13:
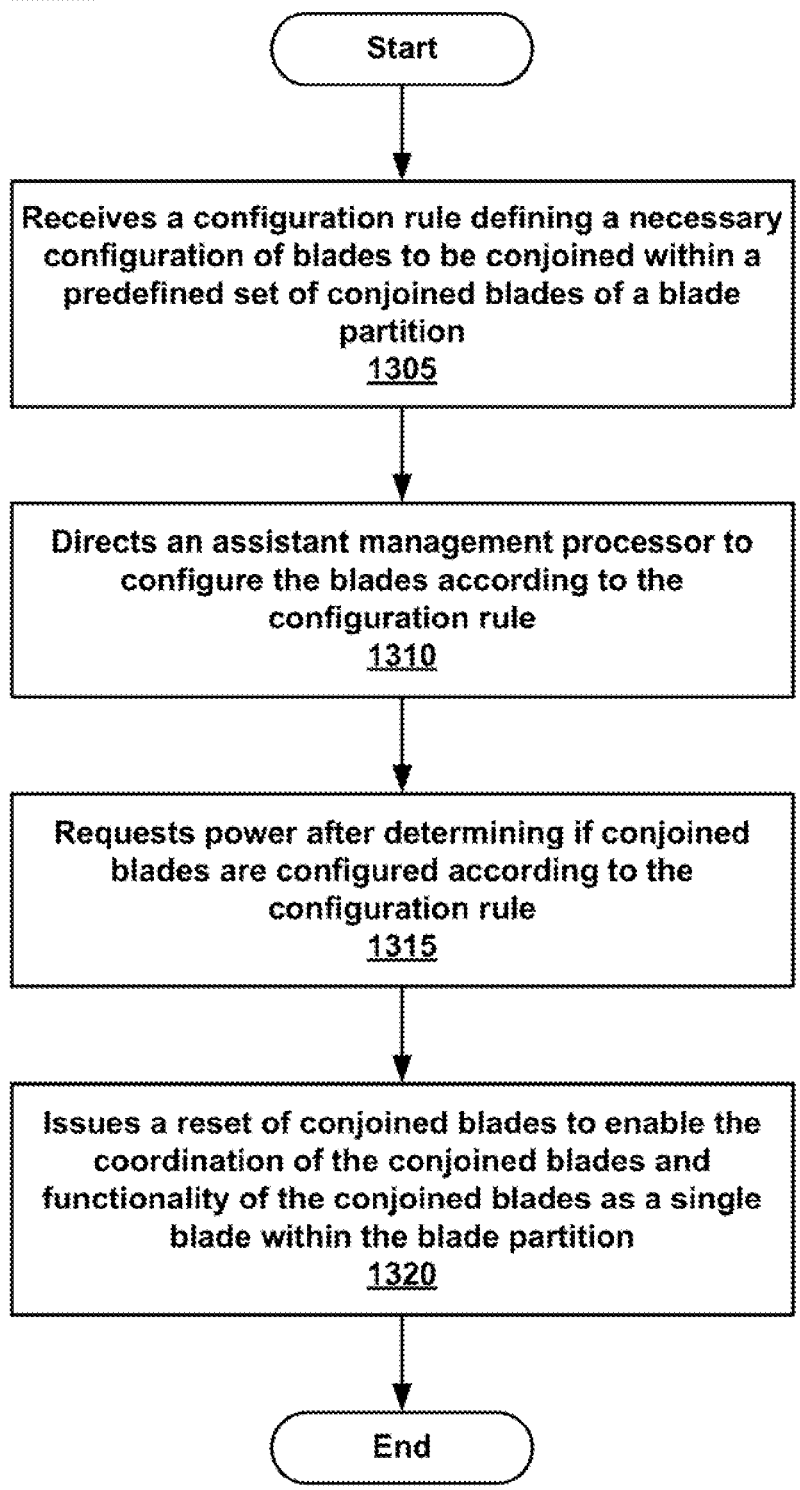
FIG. 13 is a flowchart of an example method of configuring a predefined set of electrically isolated blades to function as a single blade within a blade partition in accordance with embodiments of the present technology.

FIG. 13 is a flowchart 1300 of an example method of configuring a predefined set of electrically isolated blades 125A and 125B to function as a single blade within a blade partition. In one embodiment, the process illustrated by flow chart 1300 comprises computer-readable/computer-useable instructions stored on a computer-readable medium, such as RAM, ROM, diskette, and/or other tangible computer-readable medium. The instructions, when executed cause a computer (e.g., computer system 400 or other computer system) to perform the processes described by flowchart 1300.

Referring now to 1305 of FIG. 13 and as described herein, one embodiment receives a configuration rule defining a necessary configuration of blades 125A and 125B to be conjoined within a predefined set of conjoined blades 125A and 125B of a blade partition. As described herein, one embodiment accesses role assignations of MPs 600A and 600B coupled with conjoined blades 125A and 125B.

Referring now to 1310 of FIG. 13 and as described herein, one embodiment directs an AMP to configure blades 125A and 125B to be conjoined according to the configuration rule. As described herein, one embodiment directs AMPs to configure blade manageability modules 130A and 130B coupled with conjoined blades 125A and 125B to support the role assignations.

Referring now to 1315 of FIG. 13 and as described herein, one embodiment requests electrical power after determining if conjoined blades 125A and 125B are configured according to the configuration rule.

Referring now to 1320 of FIG. 13 and as described herein, after receiving power, one embodiment issues a reset of conjoined blades 125A and 125B to enable the coordination of conjoined blades 125A and 125B and functionality of conjoined blades 125A and 125B as a single blade within the blade partition.

Thus, the present technology provides a method and system of configuring a predefined set of electrically isolated blades to function as a single blade. Moreover, the present technology enables the dynamic reconfiguring and reassociations of any number of blades to create new permutations for the predefined set of conjoined blades.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of distributing configuration information within a predefined set of conjoined blades of a blade partition, said method comprising:

establishing a communication pathway for said predefined set of conjoined blades with a connectivity module, wherein said connectivity module is comprised within a multi-blade interconnector, wherein said predefined set of conjoined blades and said multi-blade interconnector are inside of a blade enclosure, wherein said multi-blade interconnector further comprises a database;

accessing a configuration rule at said database within said multi-blade interconnector for said predefined set of conjoined blades of a blade partition, wherein said conjoined blades within said blade partition are coupled with management processors, wherein said configuration rule comprises:

an identification of said conjoined blades and configuration information, wherein said identification is selected from the group of identifications consisting of: presence, location, MBI type, and size; and a pre-configured position of the blades with respect to one another within the set of conjoined blades;

comparing a portion of said configuration rule and a hardware configuration of said blade partition, wherein said portion is an identification of said conjoined blades;

comparing an actual position of said blades with respect to one another with said pre-configured position of the blades;

providing positive determination when said actual position of said blades matches the pre-configured position of the blades; and providing said configuration rule to said management processors of said blade partition when said portion of said configuration rule correlates with said hardware configuration.

2. The method of claim 1, further comprising:
checking configured conjoined blades coupled with said management processors; and
providing a positive determination if said configured conjoined blades are configured according to said configuration rule.

3. The method of claim 1, further comprising:
assuming a role as a manager of said management processors prior to said accessing a configuration rule for said blade partition.

4. The method of claim 1, further comprising:
providing an interface enabling a modification to said management processors according to said configuration rule.

5. The method of claim 1, further comprising:
storing said configuration rule.

6. The method claim 3, further comprising:
relinquishing said role as said manager when said configuration rule is not provided to said management processors.

7. A domain management processor (DMP) for distributing configuration information to a predefined set of conjoined blades, said DMP comprising:

a configuration rule accessor configured for accessing at a database within a multi-blade interconnector a configuration rule for a predefined set of conjoined blades of a blade partition, wherein said predefined set of conjoined blades comprises a communication pathway established by a connectivity module comprised within said multi-blade interconnector, wherein conjoined blades of said blade partition are coupled with management processors, wherein said predefined set of conjoined blades and said multi-blade interconnector are inside of a blade enclosure and wherein said configuration rule comprises:

an identification of said conjoined blades and configuration information, wherein said identification is selected from the group of identifications consisting of: presence, location, MBI type, and size;

a pre-configured position of the blades with respect to each other within the set of conjoined blades; and a desired blade quantity within said predefined set of conjoined blades; a configuration rule comparator configured for comparing a portion of said configuration rule and a hardware configuration of said blade partition, wherein said portion is an identification of said conjoined blades, and configured for comparing an actual position of said blades with respect to one another with said pre-configured position of the blades;

blade configuration determiner configured for providing positive determination when said actual position of said blades matches the pre-configured position of the blades; and a configuration rule provider configured for sending said configuration rule to said management processors of said blade partition when said configuration rule correlates with said hardware configuration.

8. The DMP of claim 7, wherein said configuration rule includes a blade quantity within said blade partition.

9. The DMP of claim 7, wherein said configuration rule includes a type of said management processors.

10. The DMP of claim 7, wherein said configuration rule includes a position of said conjoined blades within said blade partition.

11. The DMP of claim 7, further comprising:

a default manager configured for relinquishing a role as said DMP if said configuration rule is not made available to said management processors.

12. The DMP of claim 7, further comprising:

an interface generator configured for providing an interface for making partitioning changes when said configuration rule correlates with said hardware configuration.

13. A non-transitory computer usable medium wherein instructions reside thereon, which, when executed cause a computer system to perform a method of distributing configuration information to a predefined set of conjoined blades of a blade partition, said method comprising:

establishing a communication pathway for said predefined set of conjoined blades with a connectivity module, wherein said connectivity module is comprised within a multi-blade interconnector, wherein said predefined set of conjoined blades and said multi-blade interconnector are inside of a blade enclosure and wherein said multi-blade interconnector further comprises a database;

accessing a configuration rule at said database within said multi-blade interconnector, wherein said configuration rule comprises:

an identification of said conjoined blades and configuration information, wherein said identification is selected from the group of identifications consisting of: presence, location, MBI type, and size;

a pre-configured position of the blades with respect to one another within the set of conjoined blades;

a desired blade quantity within said predefined set of conjoined blades; and a type of blade management processor to be employed;

accessing hardware configuration information at management processors on conjoined blades within a predefined set of conjoined blades of a blade partition;

comparing an actual position of the blades with respect to one another with said pre-configured position of the blades;

providing positive determination when said actual position of the blades matches the pre-configured position of the blades; and sending said configuration rule to said management processors when said configuration rule correlates to said hardware configuration information, wherein said configuration rule identifies a predefined hardware configuration of said management processors.

14. The non-transitory computer usable medium of claim 13, wherein said method further comprises:

receiving partitioning changes.

15. The non-transitory computer usable medium of claim 14, wherein said method further comprises:

storing said partitioning changes.

\* \* \* \* \*

UNITED STATES PATENT AND TRADEMARK OFFICE
CERTIFICATE OF CORRECTION

PATENT NO. : 8,924,597 B2
APPLICATION NO. : 12/997138
DATED : December 30, 2014
INVENTOR(S) : Kenneth C. Duisenberg et al.

It is certified that error appears in the above-identified patent and that said Letters Patent is hereby corrected as shown below:

In the Claims

In column 22, line 35, in Claim 6, delete "method" and insert -- method of --, therefor.

Signed and Sealed this
Twenty-fourth Day of November, 2015

Michelle K. Lee
*Director of the United States Patent and Trademark Office*